(12) United States Patent
Stinson

(10) Patent No.: US 8,555,913 B2
(45) Date of Patent: Oct. 15, 2013

(54) FLUID FITTING WITH INTEGRATED FLUID MANAGEMENT DEVICE

(75) Inventor: David C. Stinson, Uxbridge (CA)

(73) Assignee: Amvex Corporation, Richmond Hill (CA)

( * ) Notice: Subject to any disclaimer, the term of this patent is extended or adjusted under 35 U.S.C. 154(b) by 928 days.

(21) Appl. No.: 11/559,542

(22) Filed: Nov. 14, 2006

(65) Prior Publication Data

US 2007/0215210 A1    Sep. 20, 2007

Related U.S. Application Data

(60) Provisional application No. 60/783,258, filed on Mar. 17, 2006.

(51) Int. Cl.
*F16L 5/00* (2006.01)
(52) U.S. Cl.
USPC .......................................... 137/360; 137/861
(58) Field of Classification Search
USPC ........... 137/360, 599.01, 599.03, 493.8, 861, 137/862, 557, 118.02, 266, 887, 625.19, 137/625.11, 625.23, 625, 561 A, 625.14, 137/625.18, 625.15, 883, 595, 625.31, 137/625.46, 625.47; 251/206; 128/205.24; 604/119
See application file for complete search history.

(56) References Cited

U.S. PATENT DOCUMENTS

| | | | |
|---|---|---|---|
| 1,512,022 A * | 10/1924 | Hendrickson ................ 137/81.1 |
| 1,982,754 A | 12/1934 | Bert |
| 2,742,052 A | 4/1956 | McKee |
| 3,814,093 A * | 6/1974 | Gregory ................... 128/203.19 |
| 3,848,617 A | 11/1974 | Dray |
| 3,949,966 A | 4/1976 | Fabish |
| 4,241,896 A | 12/1980 | Voege |
| 4,646,211 A | 2/1987 | Gallant et al. |
| 5,183,077 A * | 2/1993 | Keiper ..................... 137/625.47 |
| 5,197,511 A | 3/1993 | Kohn et al. |
| 5,236,005 A | 8/1993 | Berg |
| 5,411,059 A * | 5/1995 | Sever et al. .............. 137/599.04 |
| 5,593,136 A | 1/1997 | Reed et al. |
| 6,053,056 A | 4/2000 | Zaiser et al. |
| 6,189,560 B1 | 2/2001 | Reynolds |
| 6,321,782 B1 * | 11/2001 | Hollister ....................... 137/557 |
| 6,510,747 B1 | 1/2003 | Zaiser et al. |
| 2004/0118460 A1 * | 6/2004 | Stinson ......................... 137/557 |

* cited by examiner

*Primary Examiner* — Kevin Lee
*Assistant Examiner* — Macade Brown
(74) *Attorney, Agent, or Firm* — Jonathan M. D+Silva; MacDonald, Illig, Jones & Britton LLP

(57) ABSTRACT

A fluid fitting is described for use in facilities that have a plurality of surfaces, a source of fluid pressure, and at least one fluid handling conduit extending from the source of fluid pressure to one of the surfaces. The fluid fitting comprises a mounting component to enable the fluid fitting to be attached to a surface of the facility, a conduit adapter connectable to the fluid handling conduit, a port having a flow path to the conduit adapter to enable a fluid connection between the conduit adapter and the port, and a fluid management device located in the flow path.

42 Claims, 31 Drawing Sheets

US 8,555,913 B2

1

FLUID FITTING WITH INTEGRATED FLUID MANAGEMENT DEVICE

This application takes priority from U.S. provisional application 60/783,258 filed Mar. 17, 2006, which is incorporated herein by reference.

BACKGROUND

In facilities with fluid pressure sources, networks of fluid handling conduits are used to distribute fluids or provide vacuum with fluid fittings installed where fluid is dispensed or vacuum is provided. An improved fluid fitting for connection to fluid handling conduits is provided.

SUMMARY

A fluid fitting is provided for use in a facility that has a plurality of surfaces, a source of fluid pressure, and at least one fluid handling conduit extending from the source of fluid pressure to one of the surfaces. The fluid fitting comprises a mounting component to enable it to be attached to a surface of the facility, a conduit adapter connectable to the fluid handling conduit, a port having a flow path to the conduit adapter that enables a fluid connection between the conduit adapter and the port, and a fluid management device located in the flow path.

While the fluid fitting can comprise a single port with an integrated fluid management device, additional ports with or without fluid management devices can also be integrated into the fluid fitting. For example, the fluid fitting can comprise two ports, with a fluid management device installed in the flow path of one of the two ports and the other port connected directly to the fluid handling conduit. Additionally each port can be connected to multiple fluid management devices. For example, a single port in a fluid fitting can have a flowmetering device and a flow measuring device in the flow path between the conduit adapter and the port.

The fluid fitting can be mounted on walls, semi-recessed flat walls, service columns, horizontal headwalls, ceiling mounted service columns, equipment rails, wall panels, floor panels, ceiling panels, beds, surgical tables, floor pedestals, or any other location at which a fluid fitting is required. The fluid fitting could be installed in mobile facilities, such as ambulances and aircraft, as well as fixed facilities such as buildings.

Those skilled in the art will realize that this invention is capable of embodiments that are different from those shown and that details of the structure of the fluid fitting can be changed in various manners without departing from the scope of this invention. Accordingly, the drawings and descriptions are to be regarded as including such equivalent embodiments as do not depart from the spirit and scope of this invention.

BRIEF DESCRIPTION OF THE DRAWINGS

For a more complete understanding and appreciation of this invention, and its many advantages, reference will be made to the following detailed description taken in conjunction with the accompanying drawings.

2

Figure 2A:
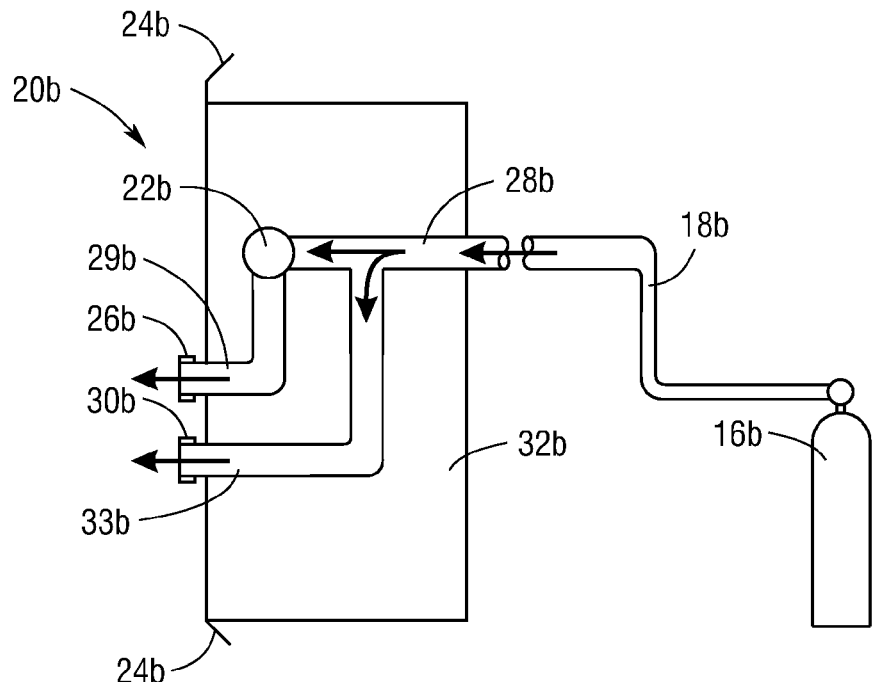
Figure 2B:
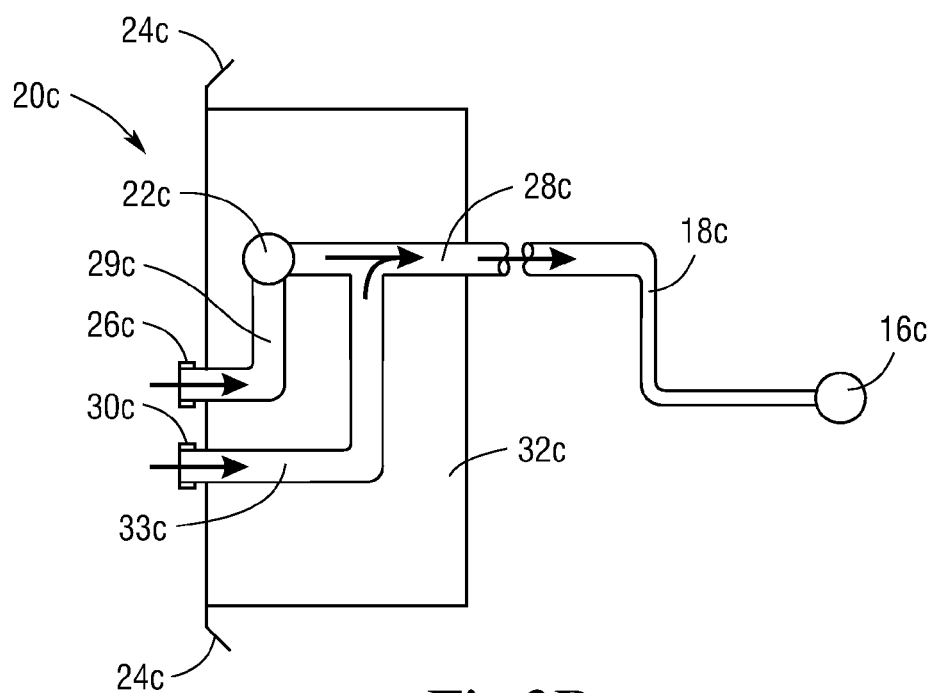
Figure 3:
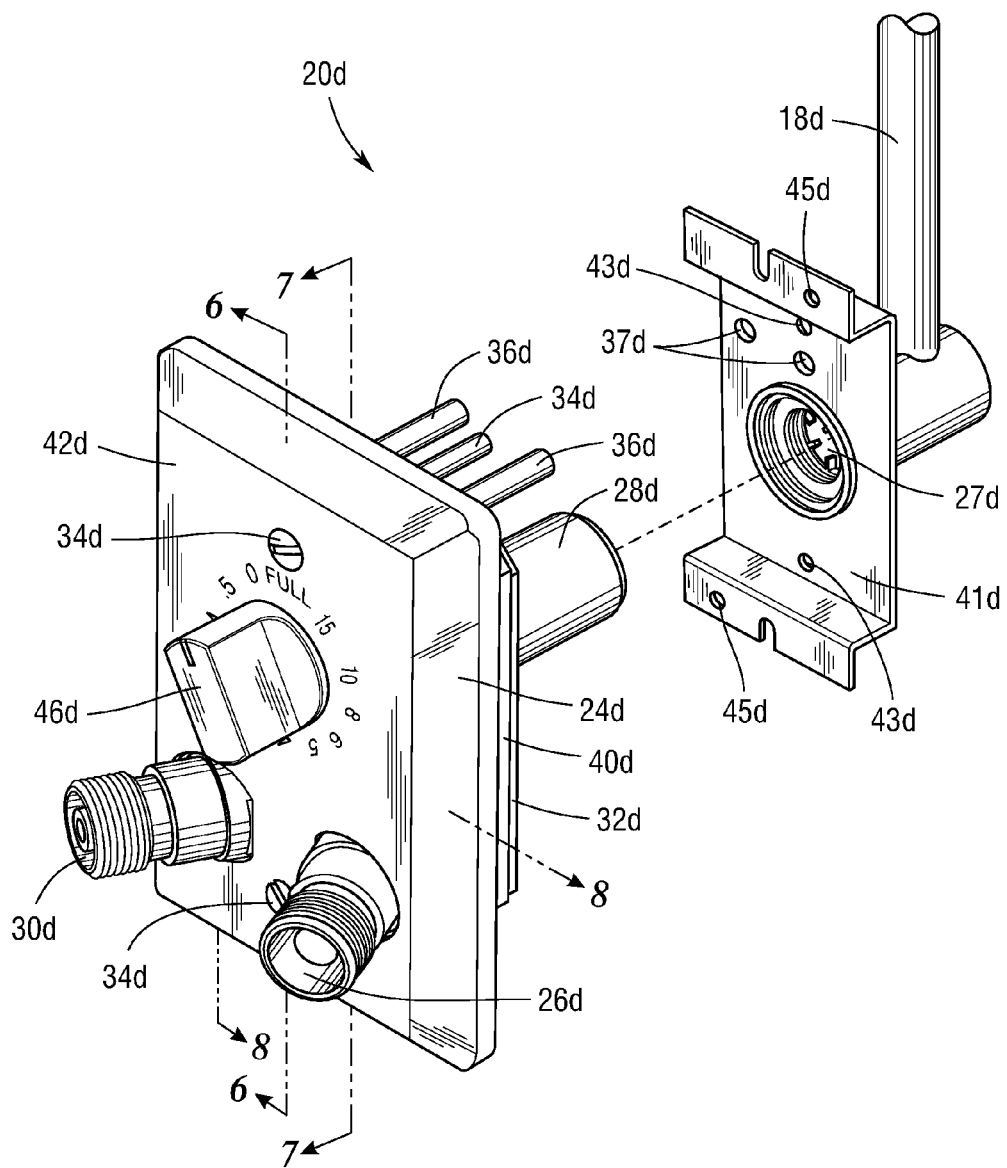
Figure 4:
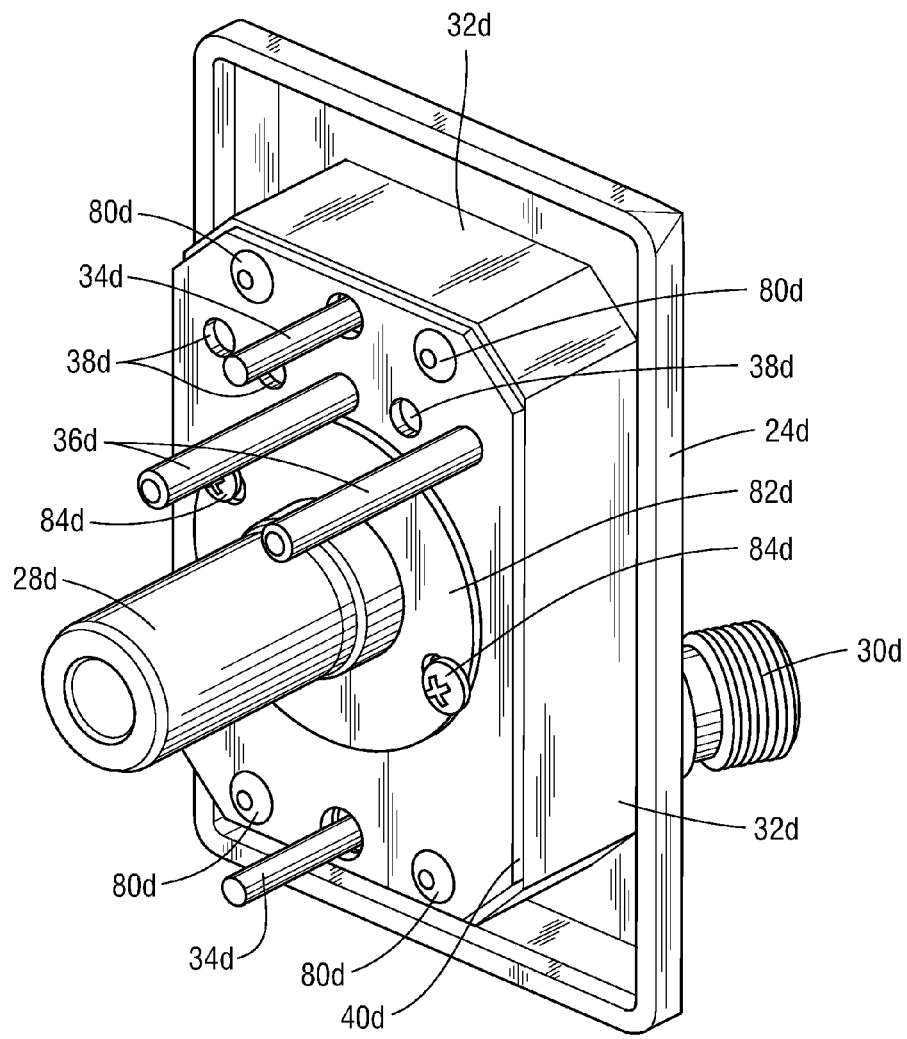
Figure 5:
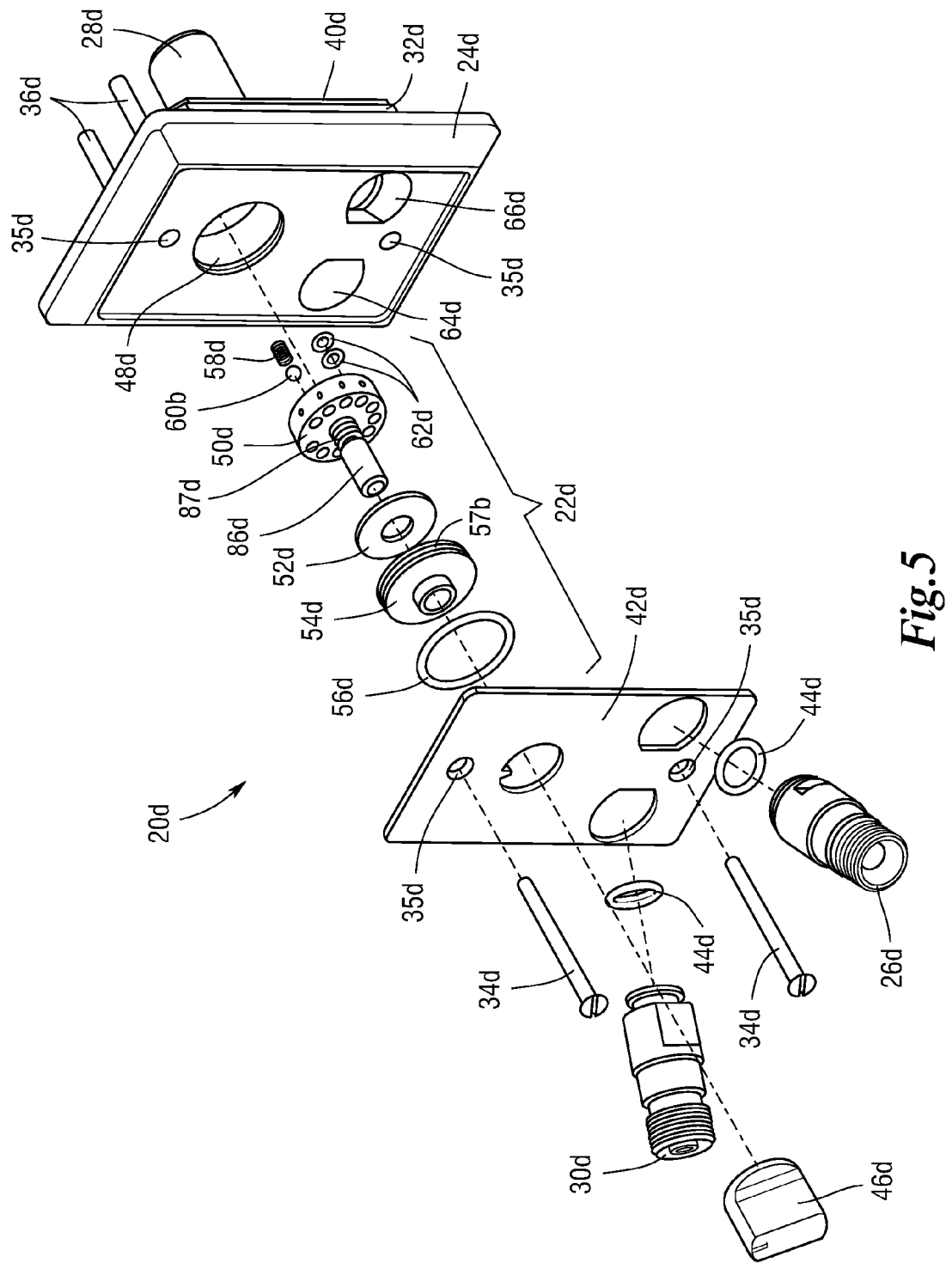
Figure 6:
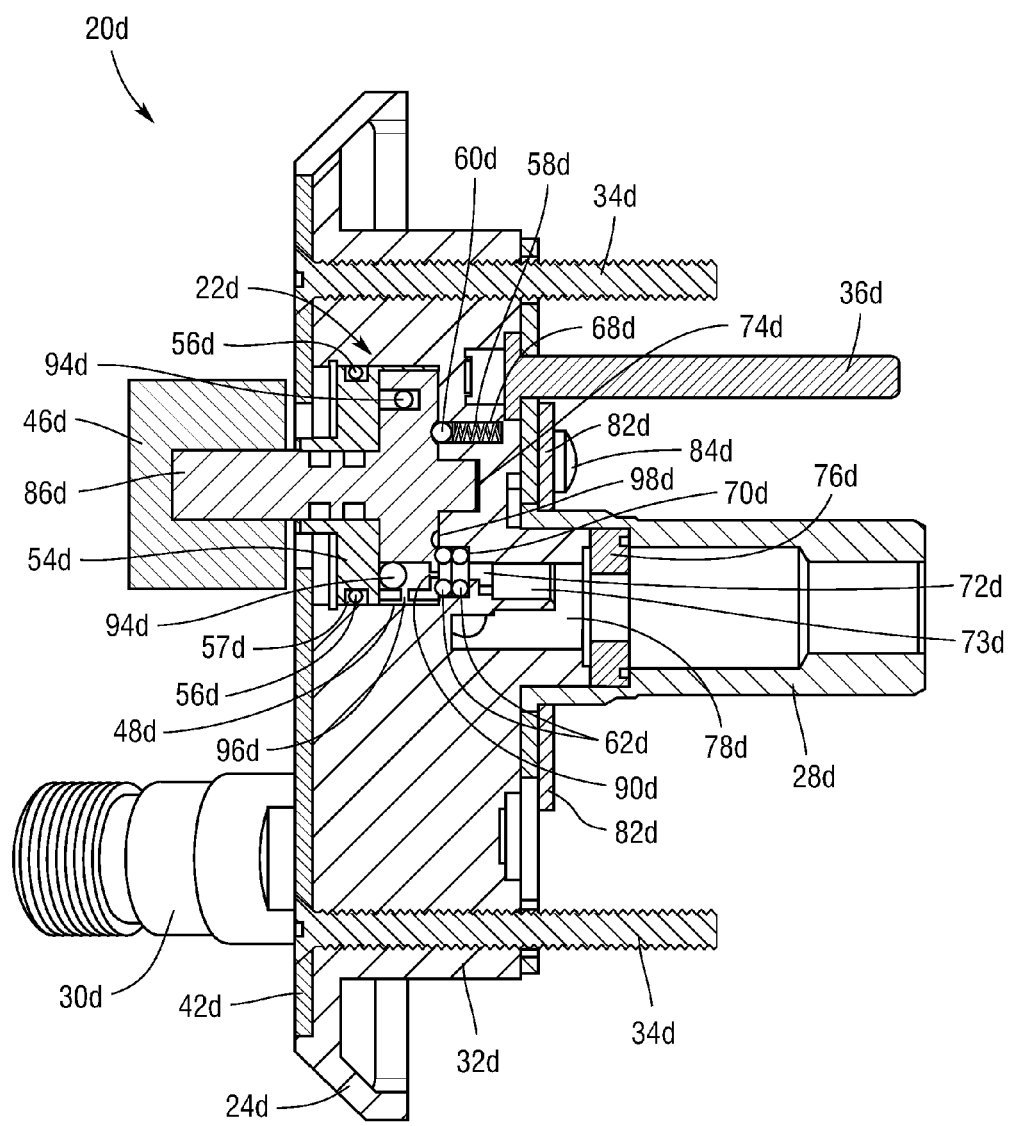
Figure 7:
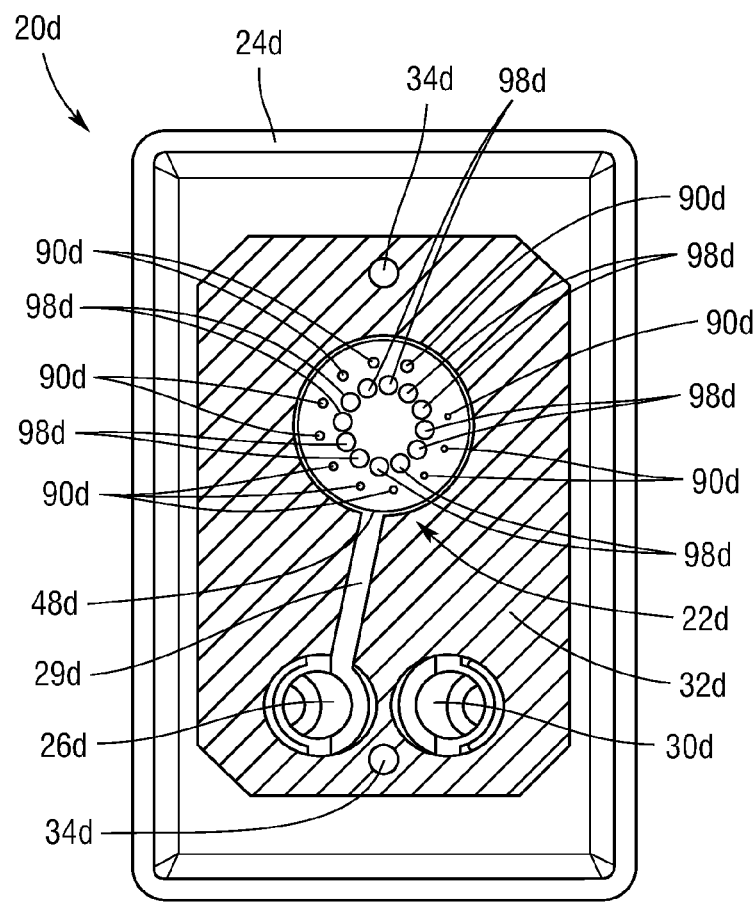
Figure 8:
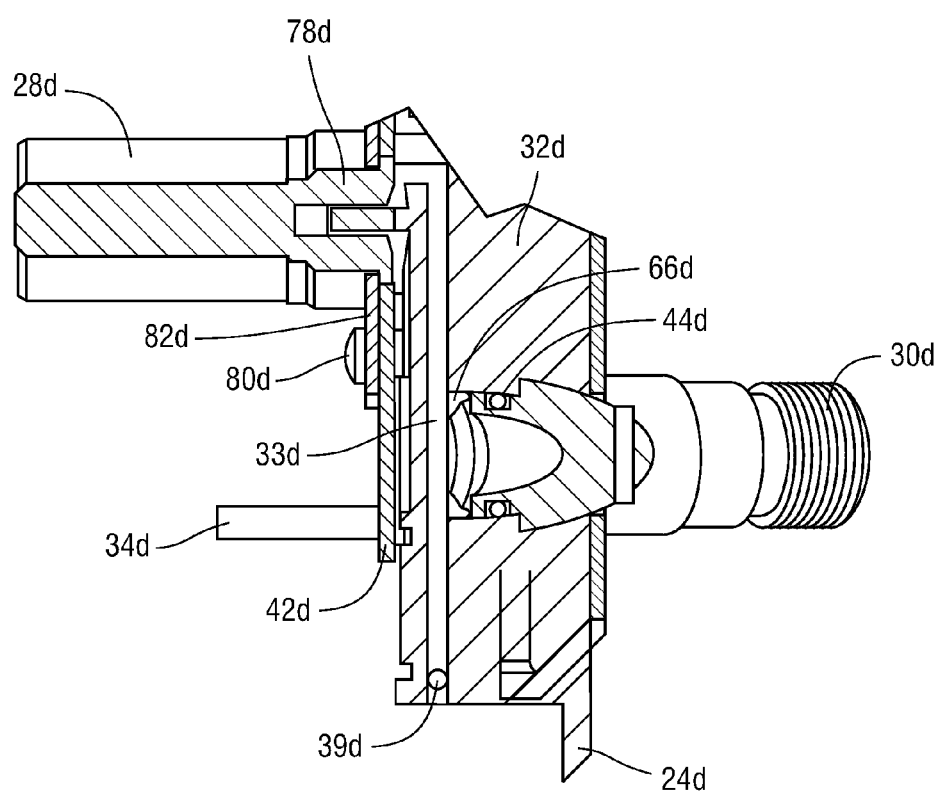
Figure 9:
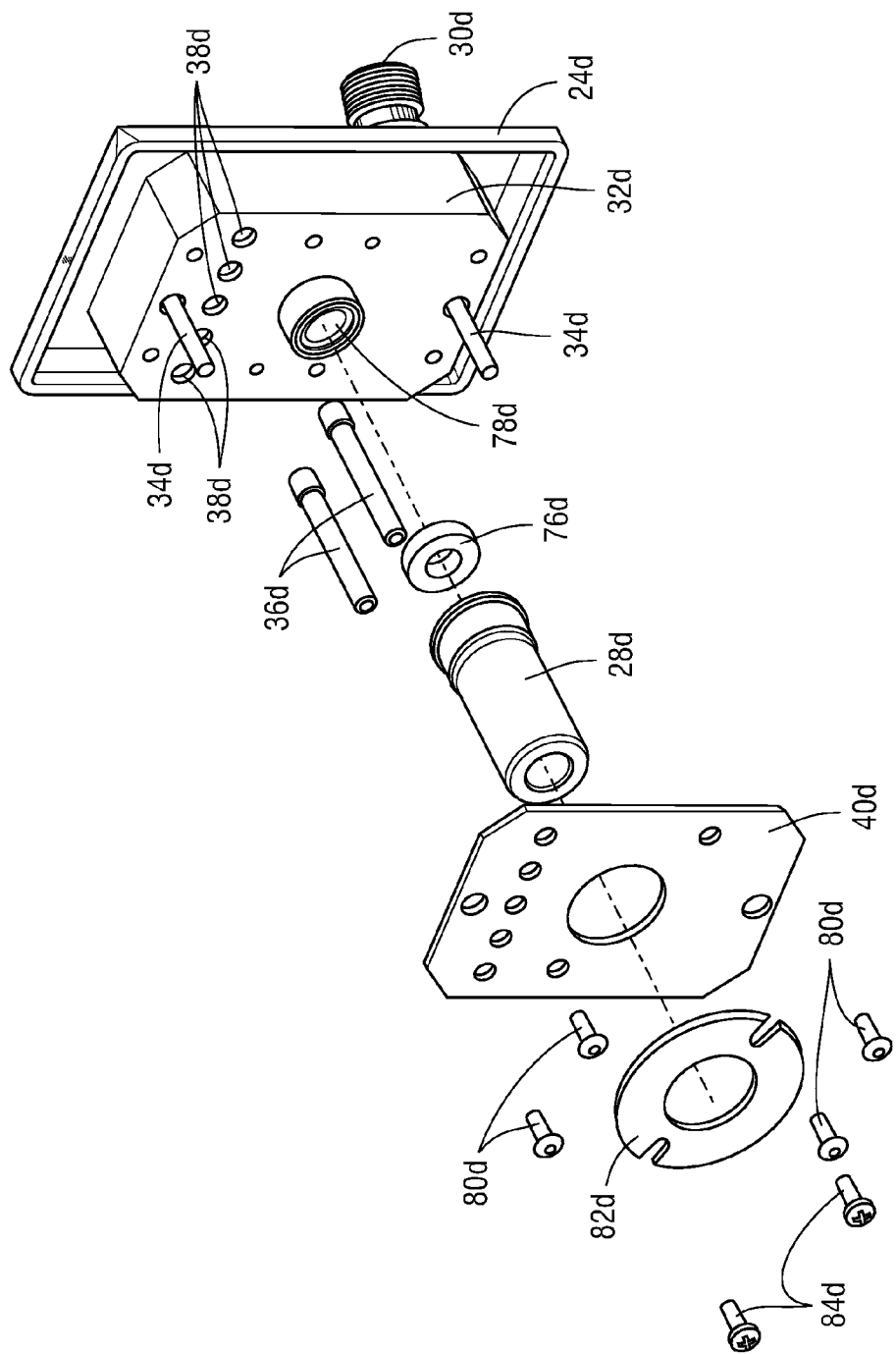
Figure 10:
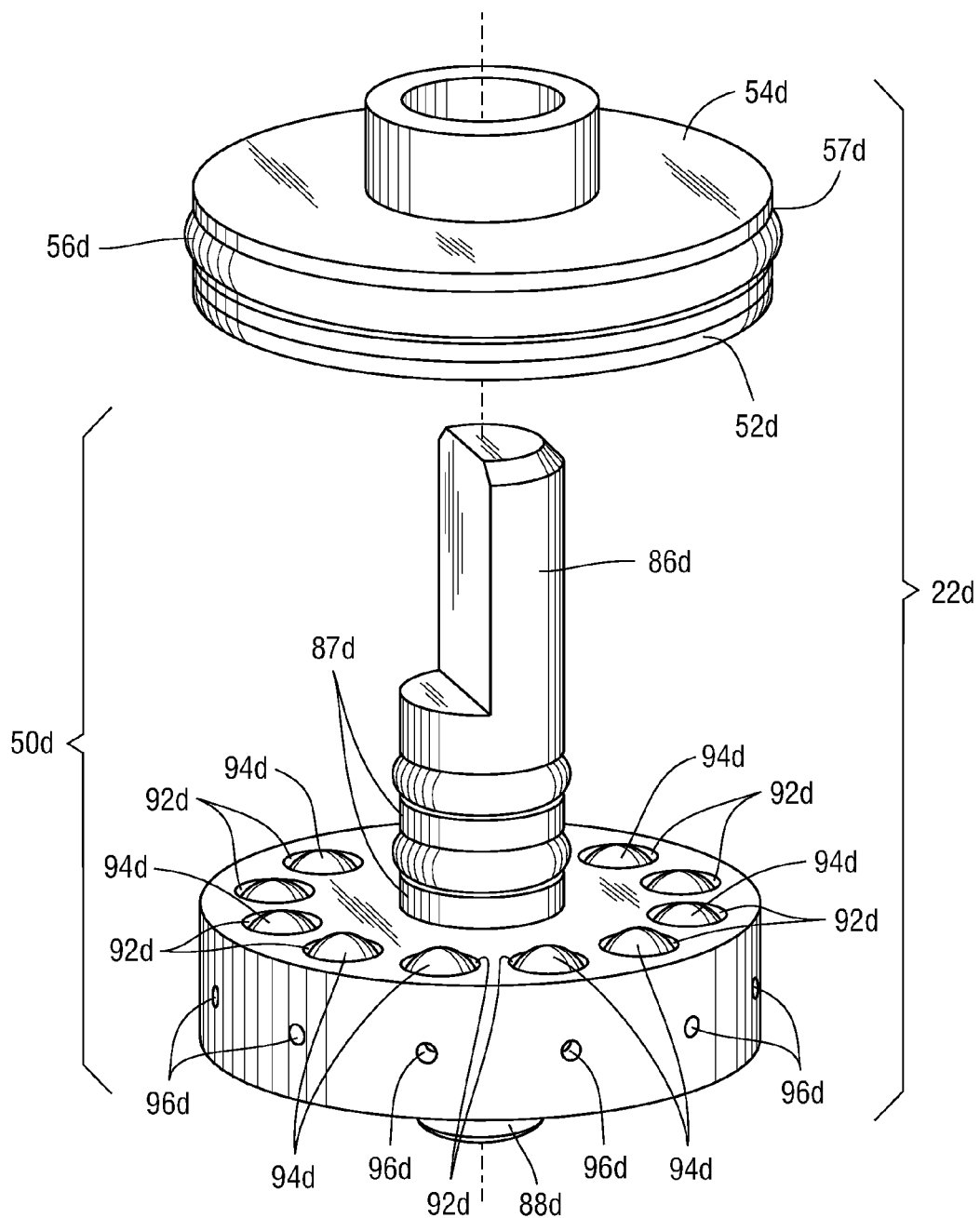
Figure 11:
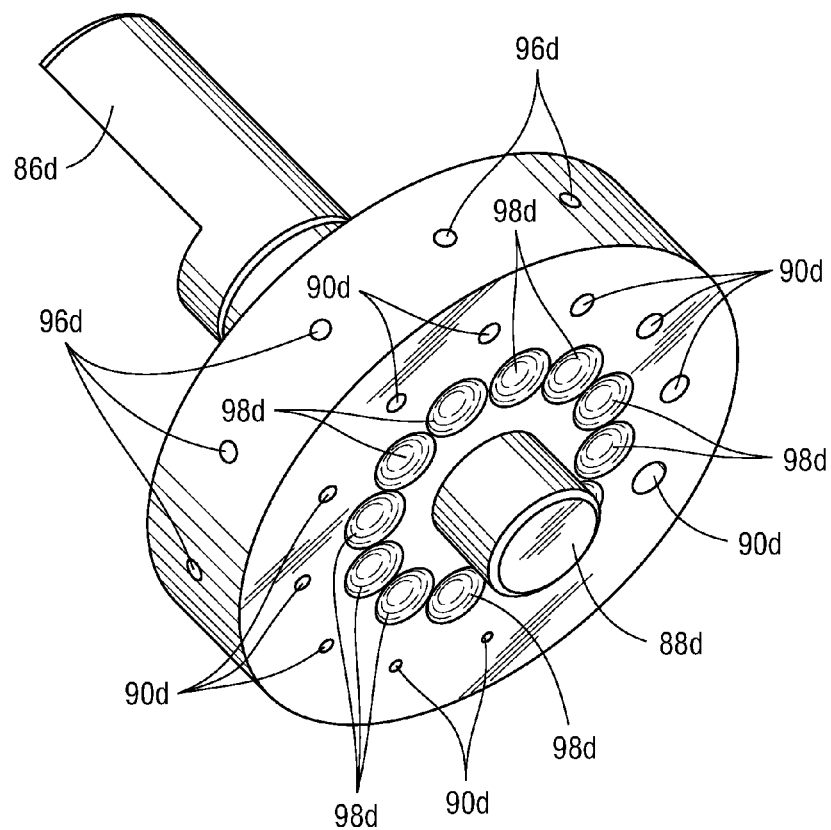
Figure 12:
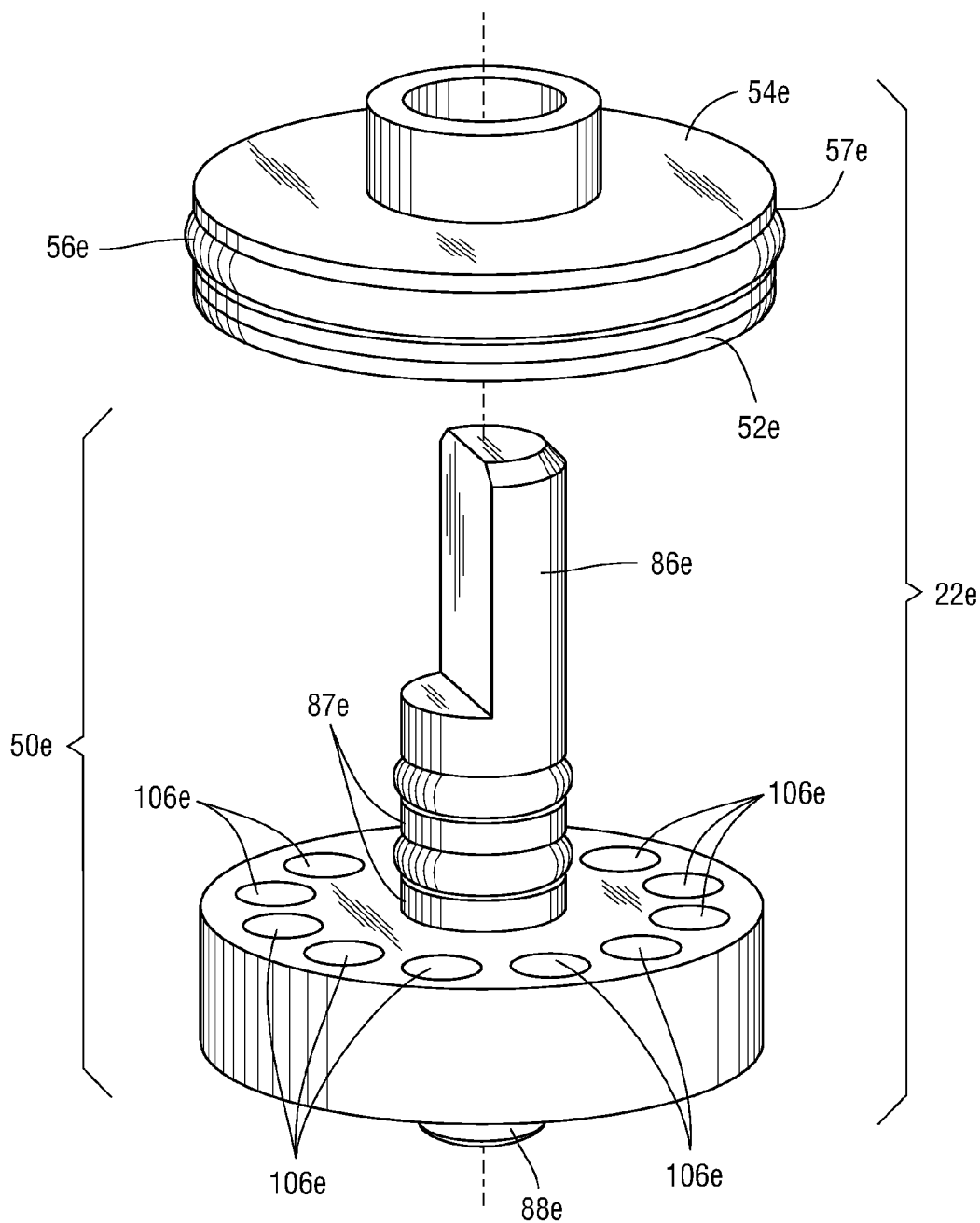
Figure 13:
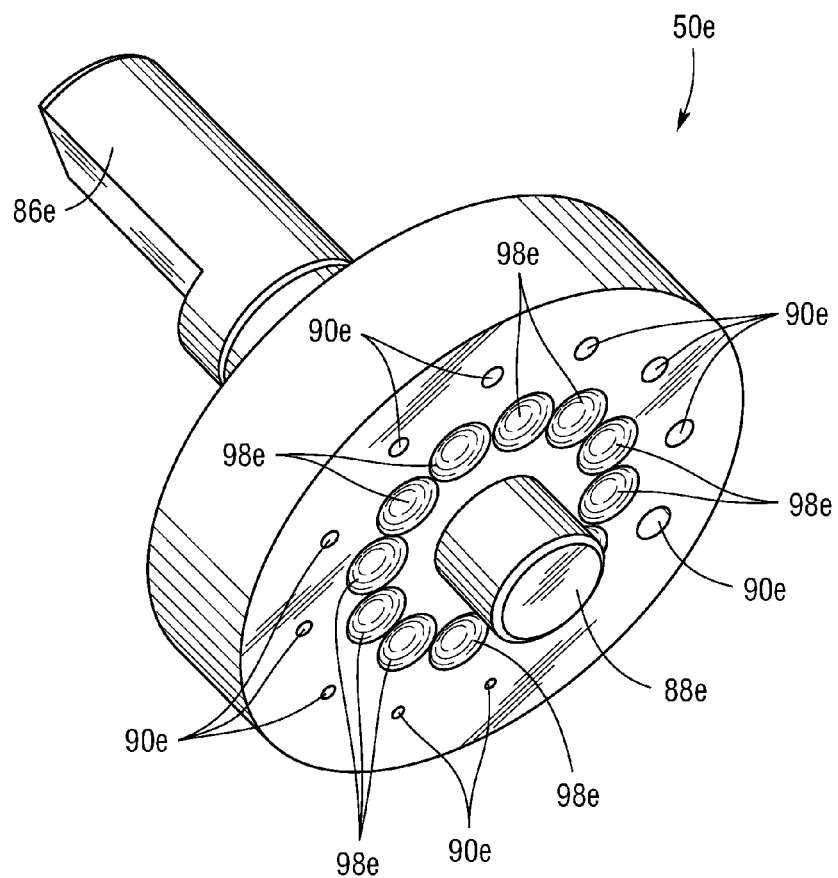
Figure 14:
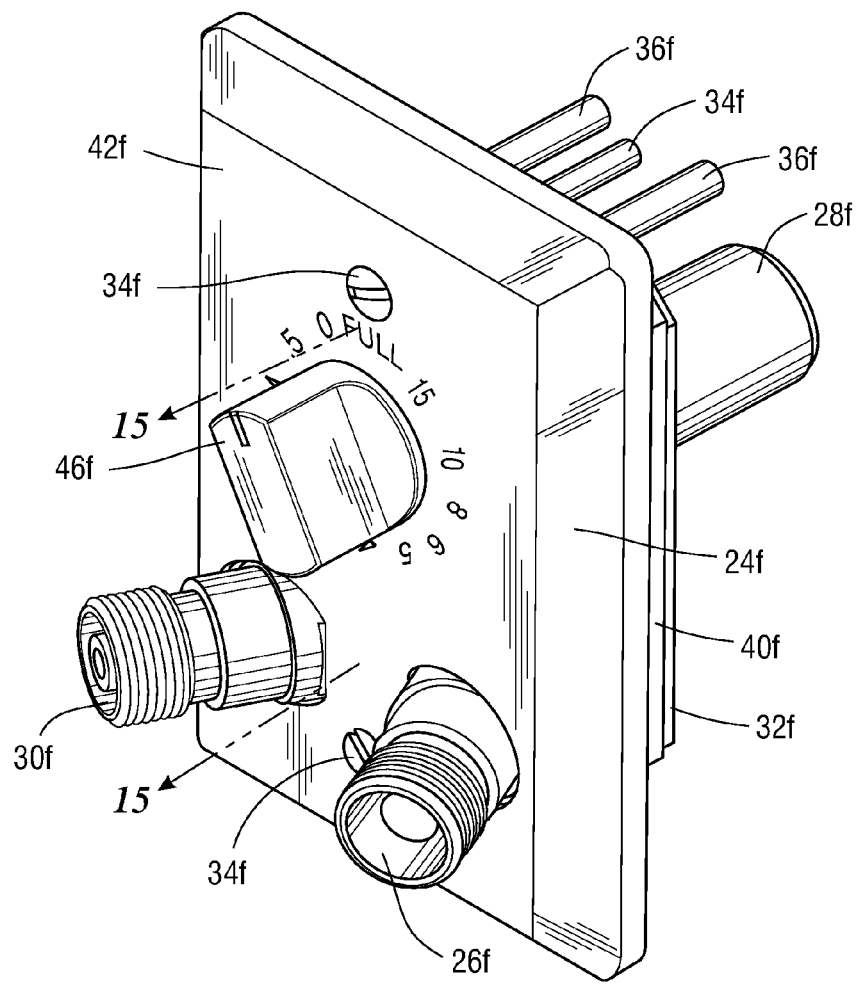
Figure 15:
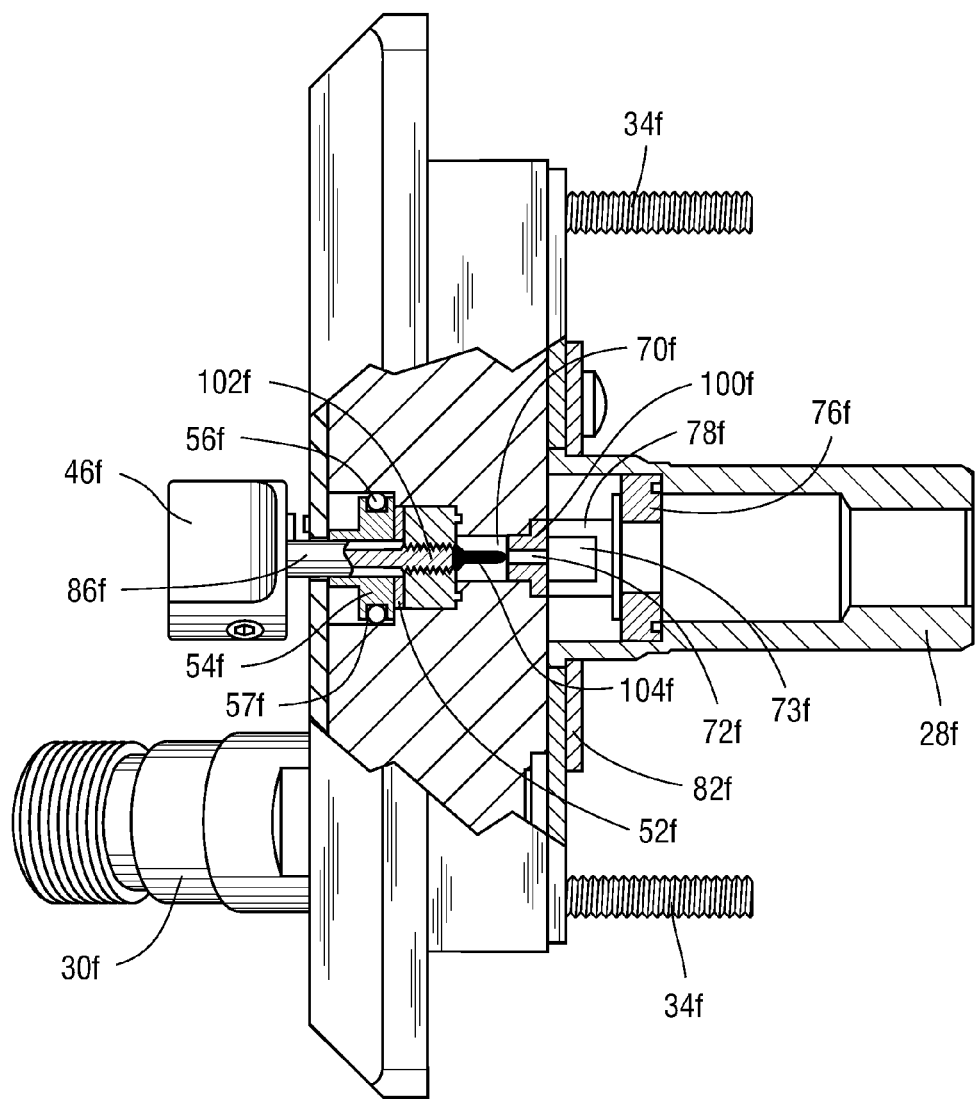
Figure 16:
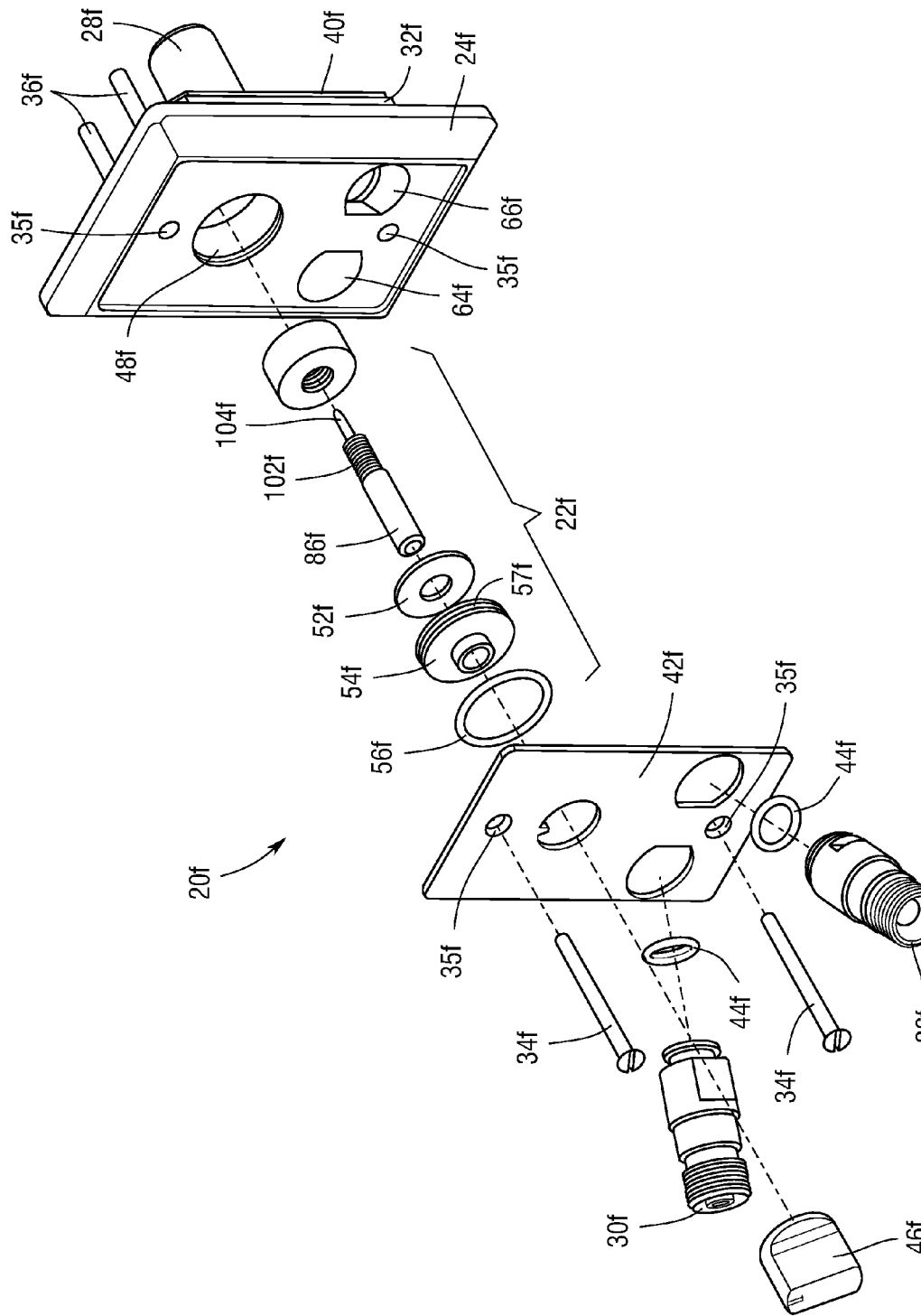
Figure 17:
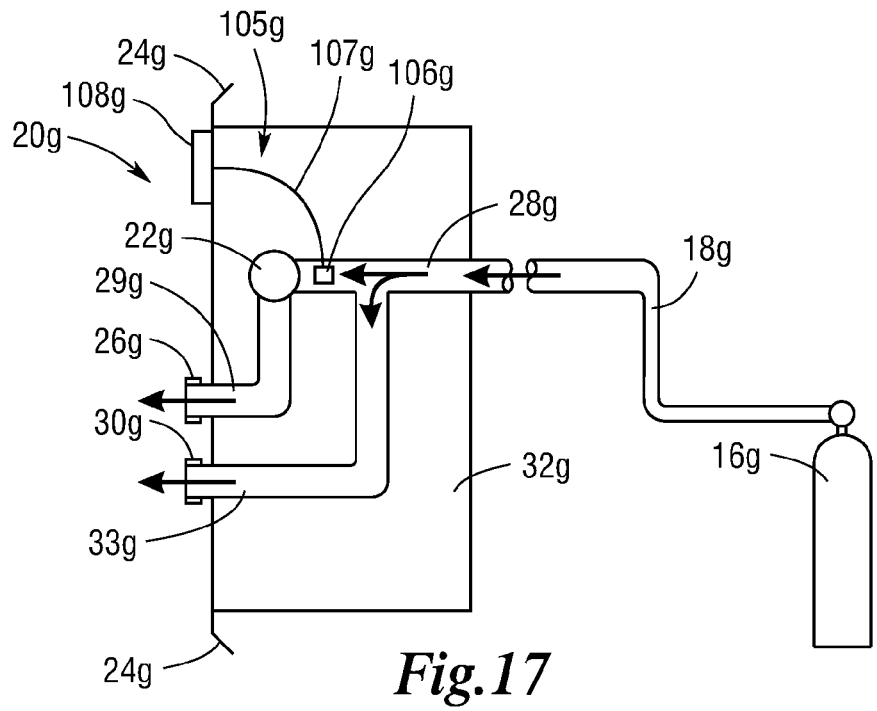
Figure 18:
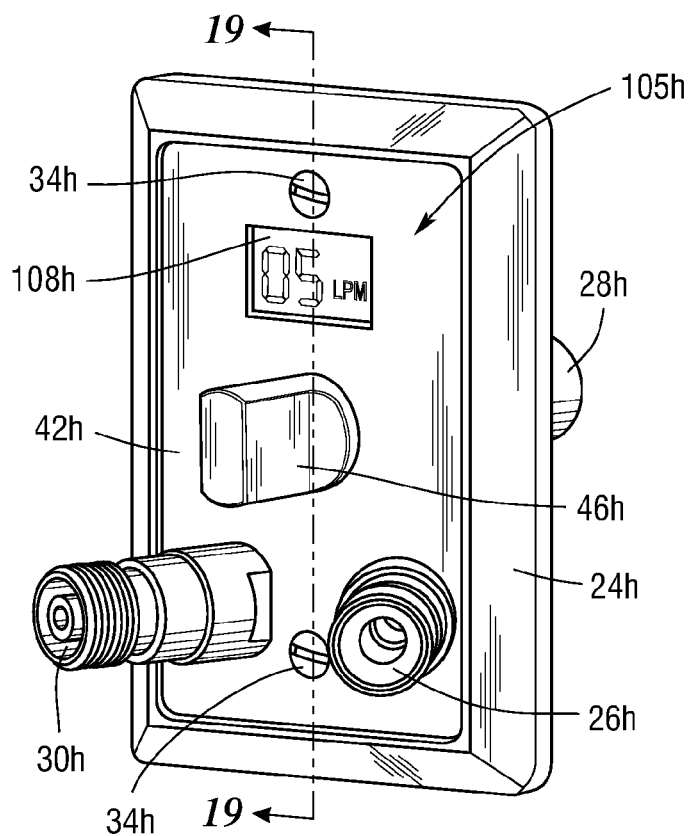
Figure 19:
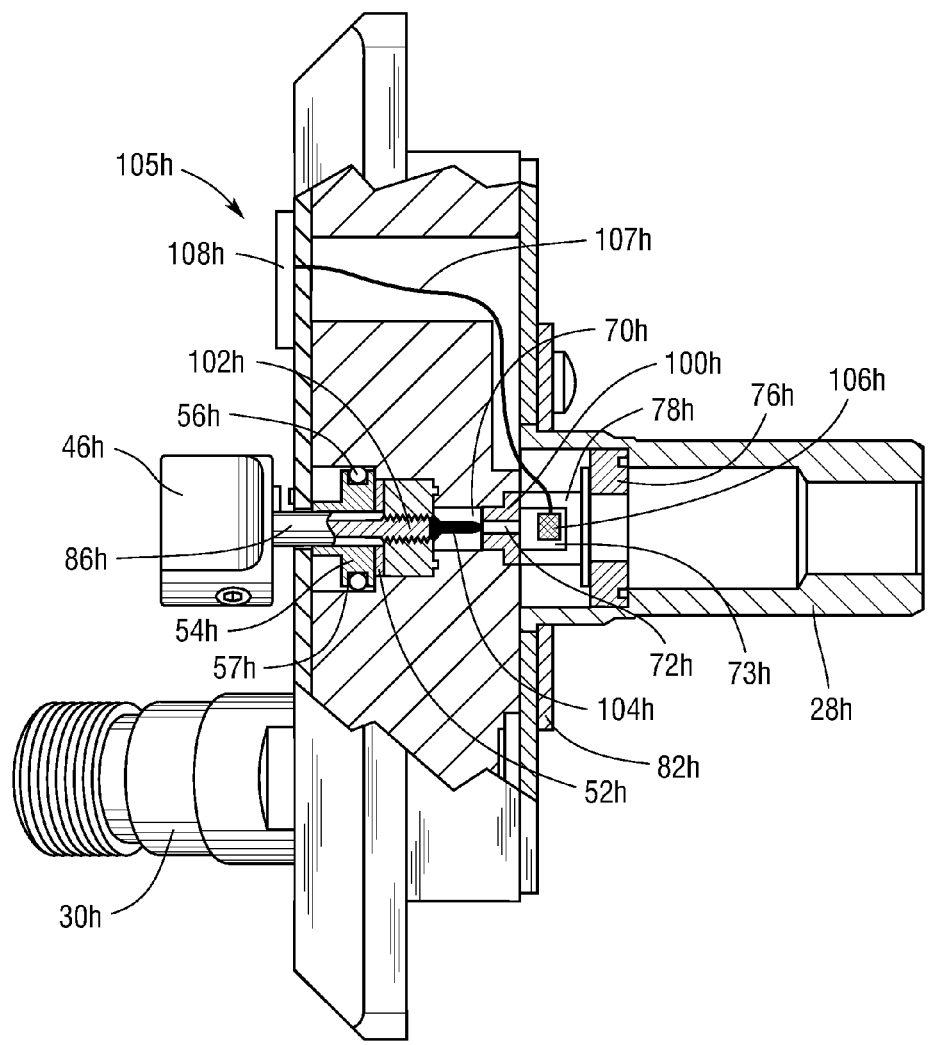
Figure 20:
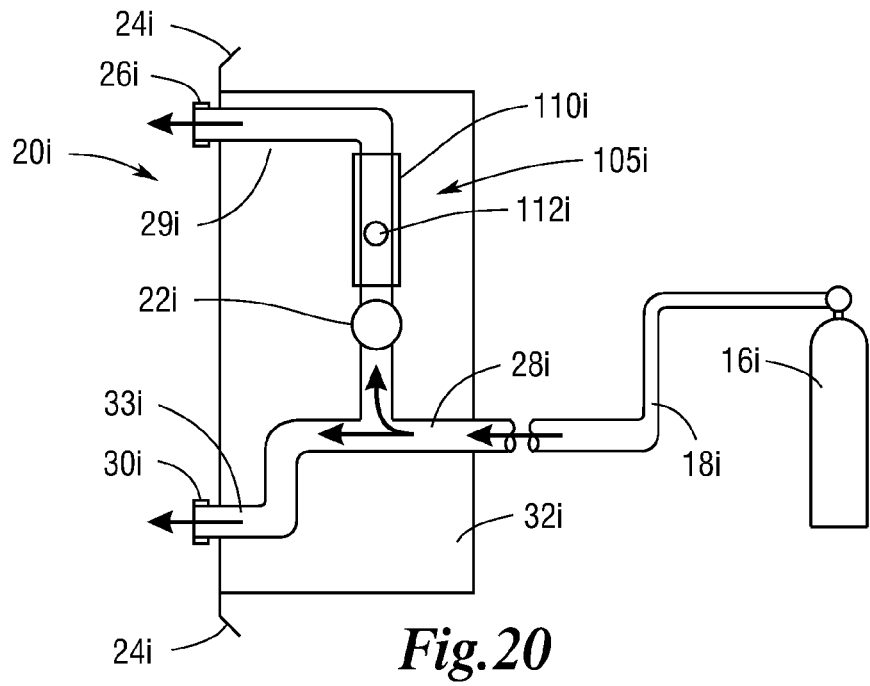
Figure 21:
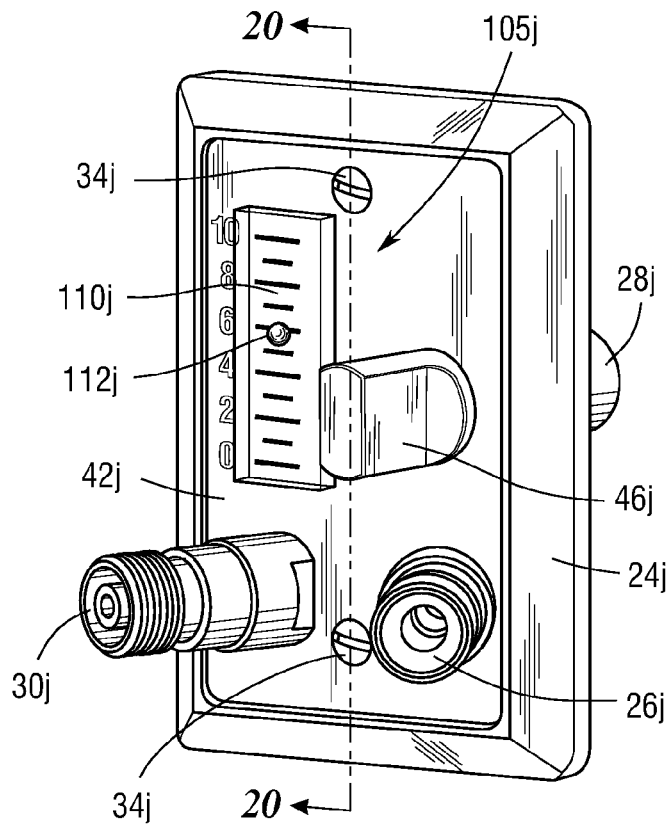
Figure 22:
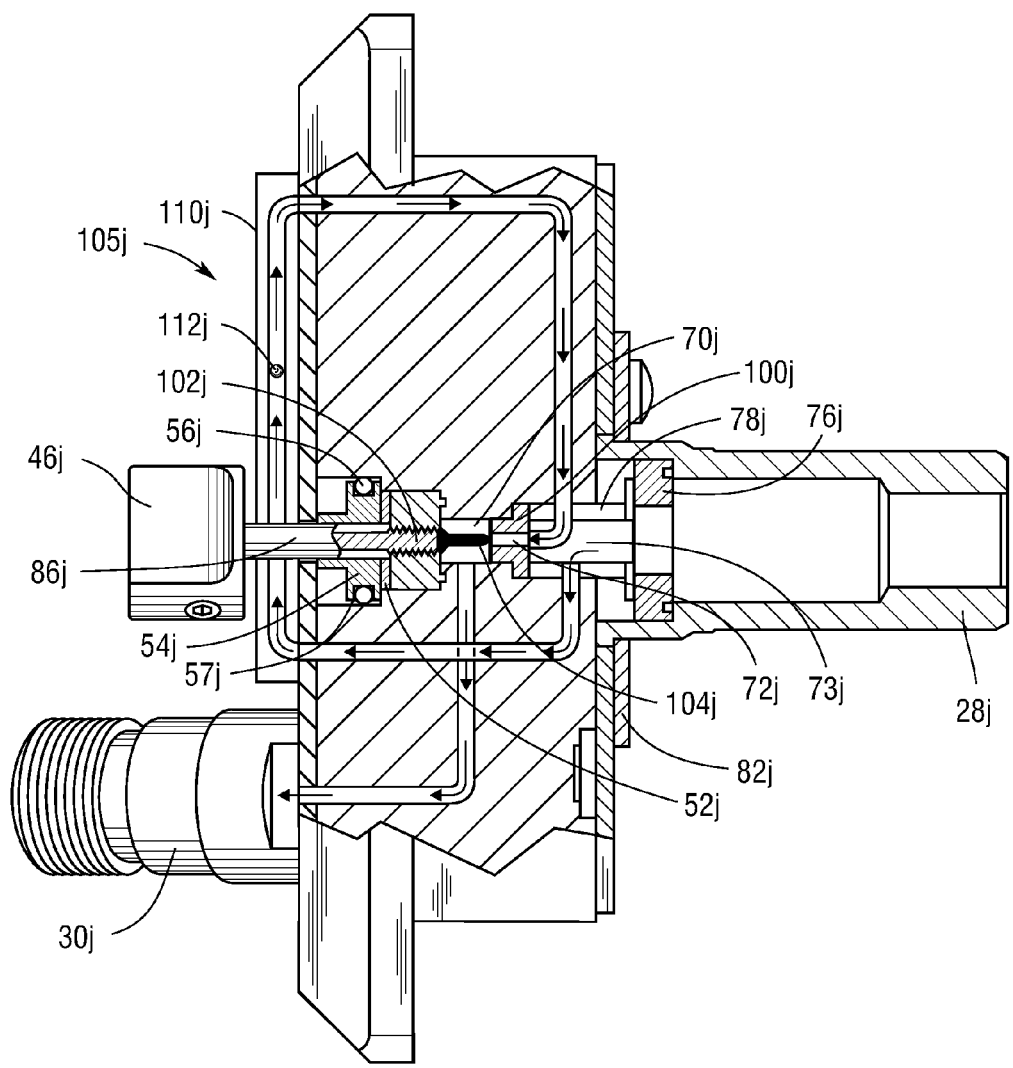
Figure 23:
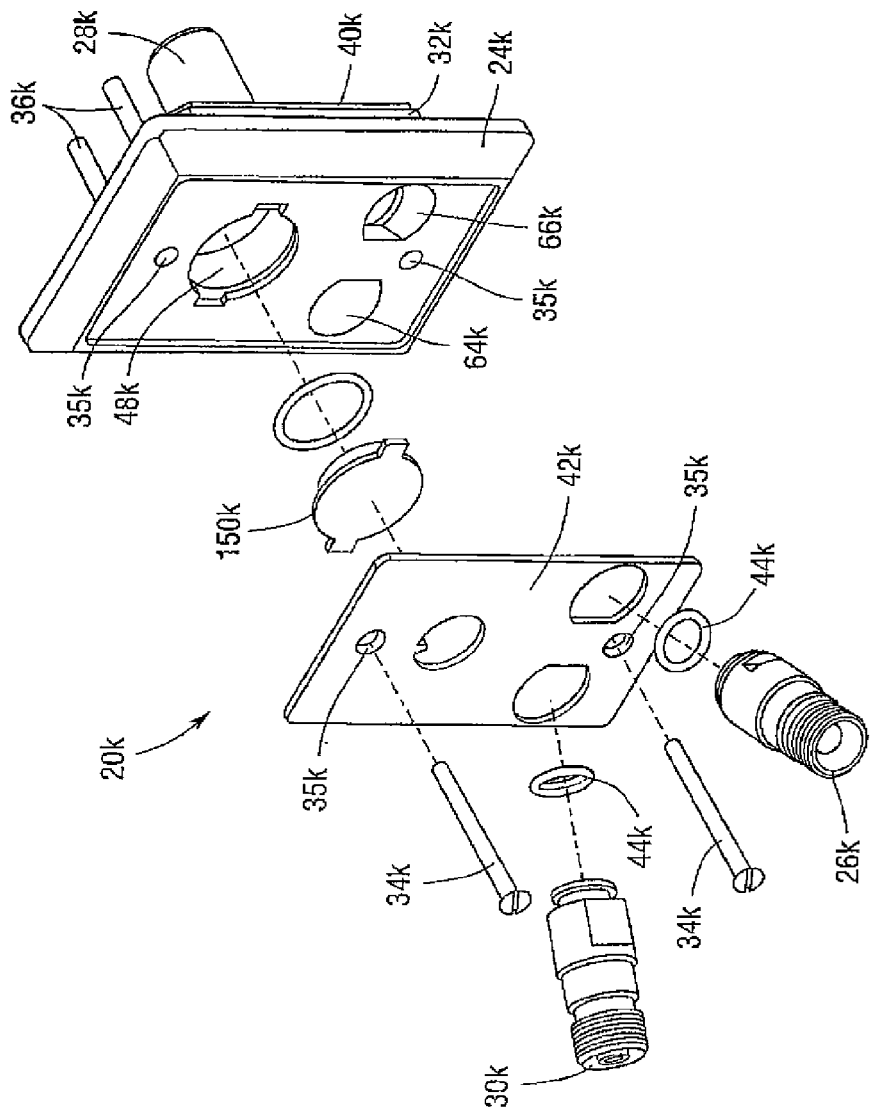
Figure 24:
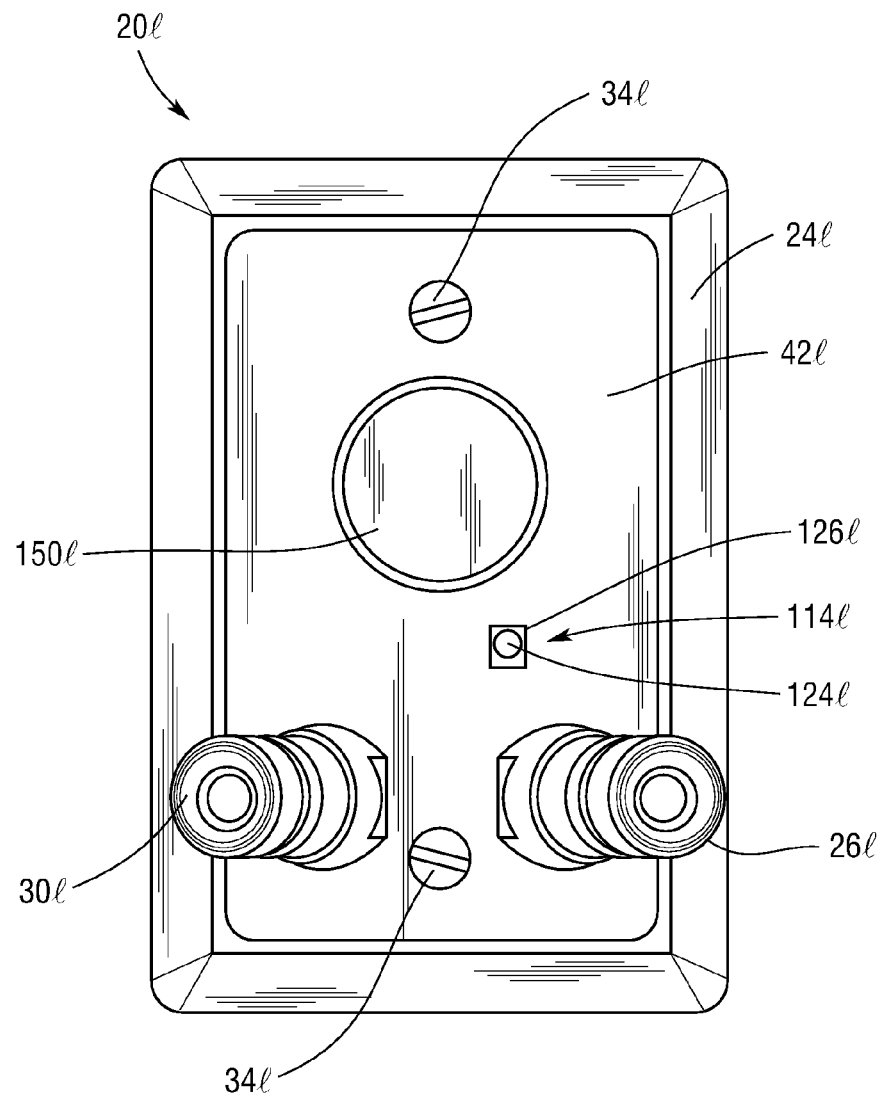
Figure 25:
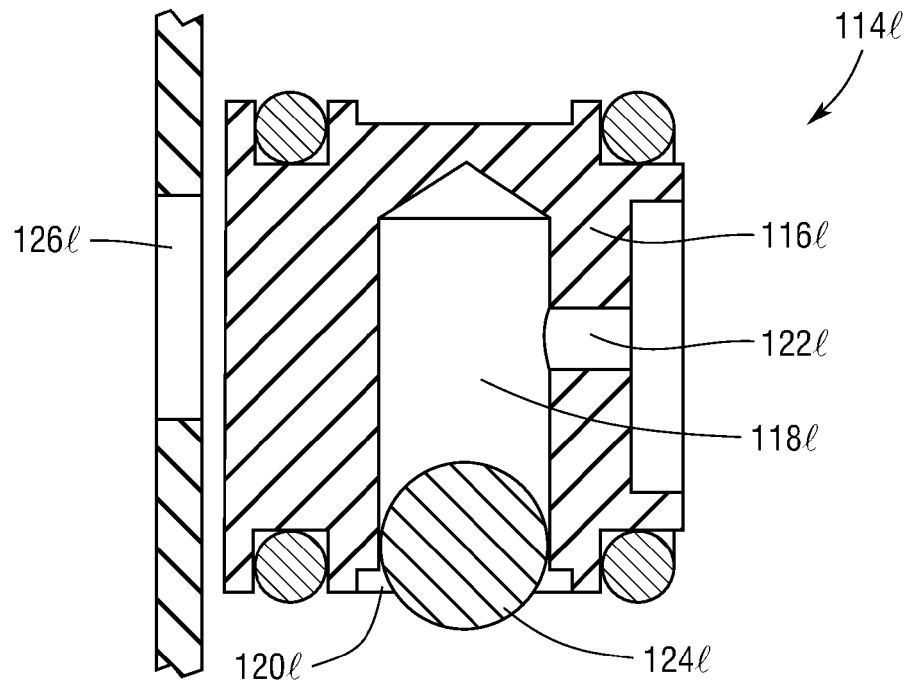
Figure 26:
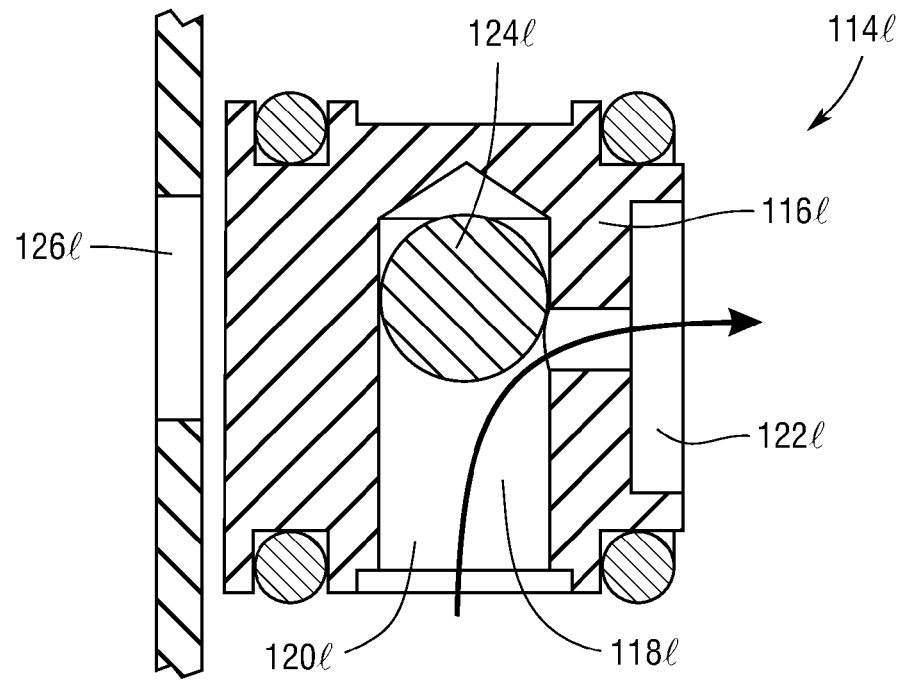
Figure 27:
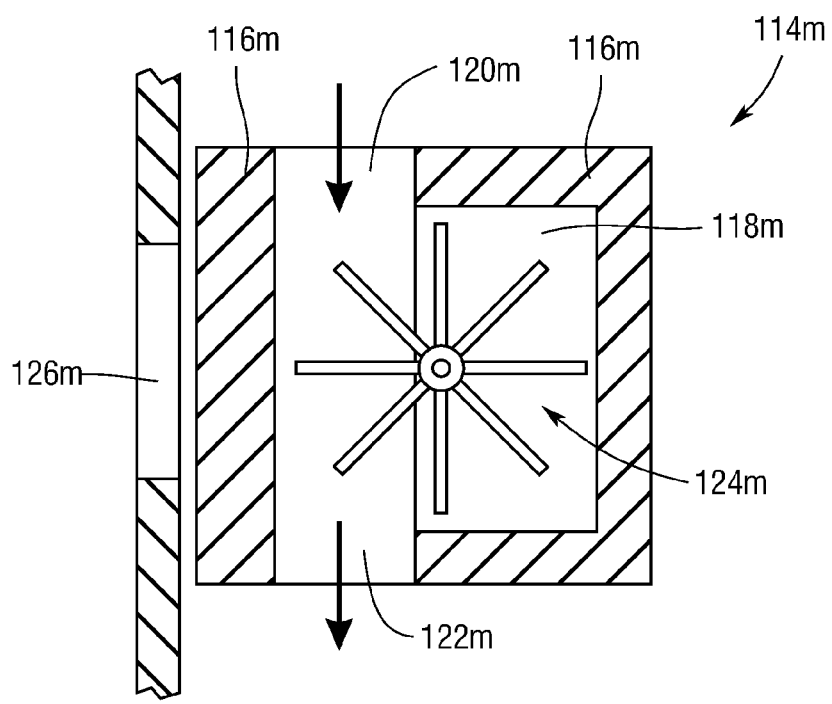
Figure 28A:
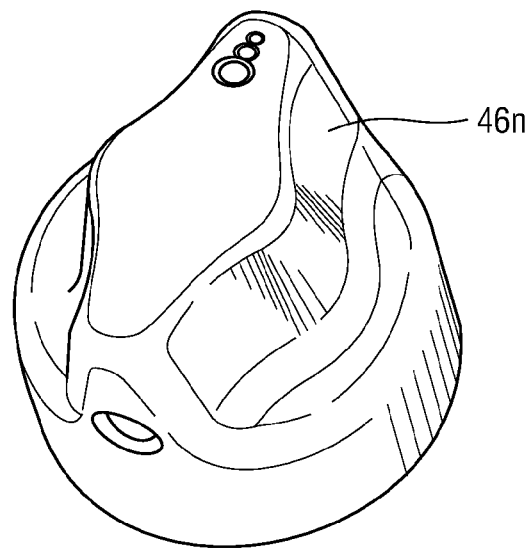
Figure 28B:
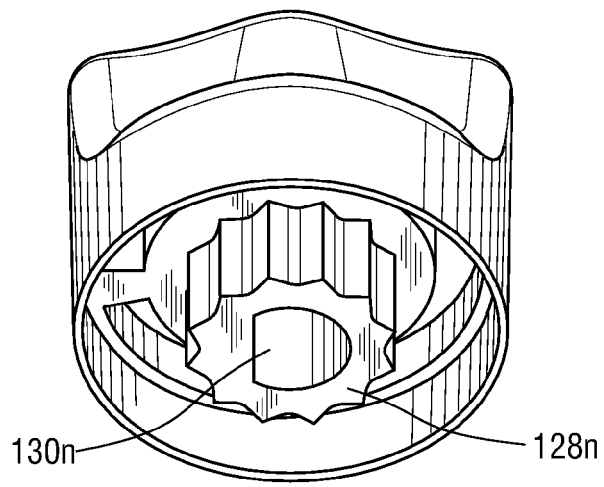
Figure 29A:
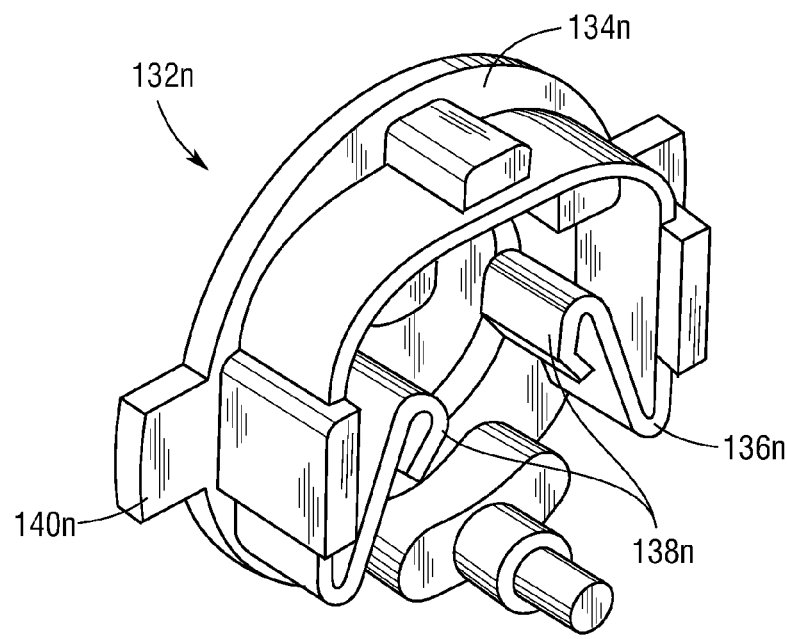
Figure 29B:
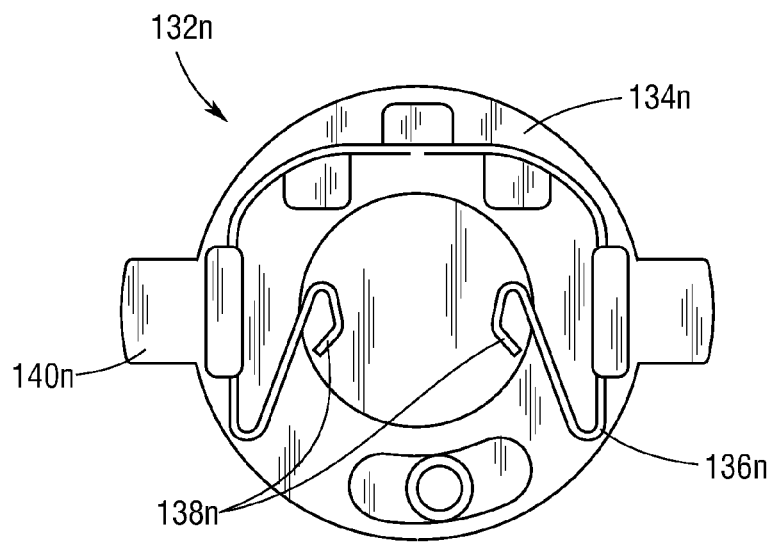
Figure 30:
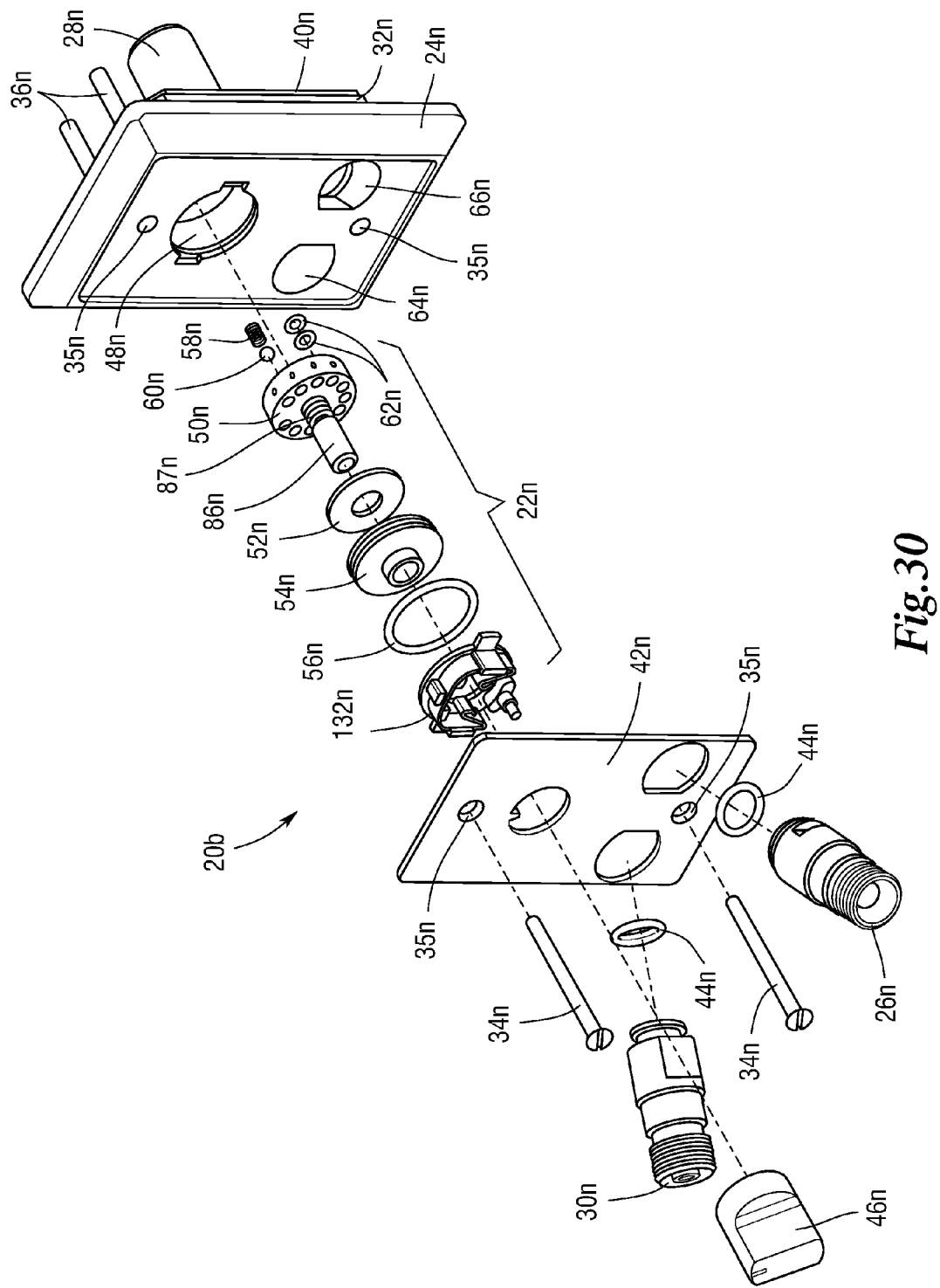
Figure 31A:
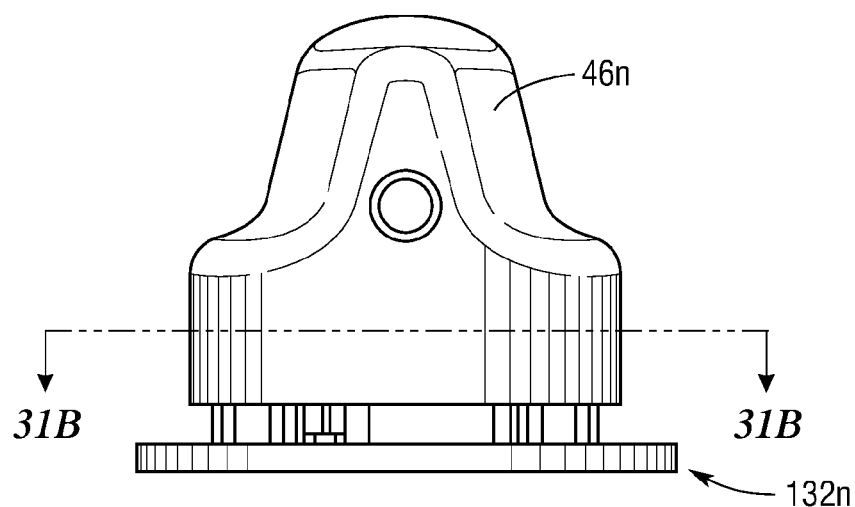
Figure 31B:
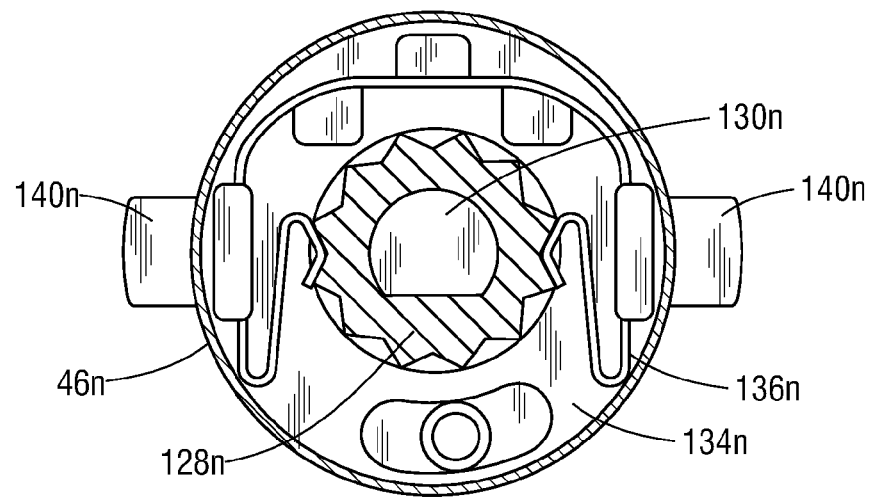
Figure 32A:
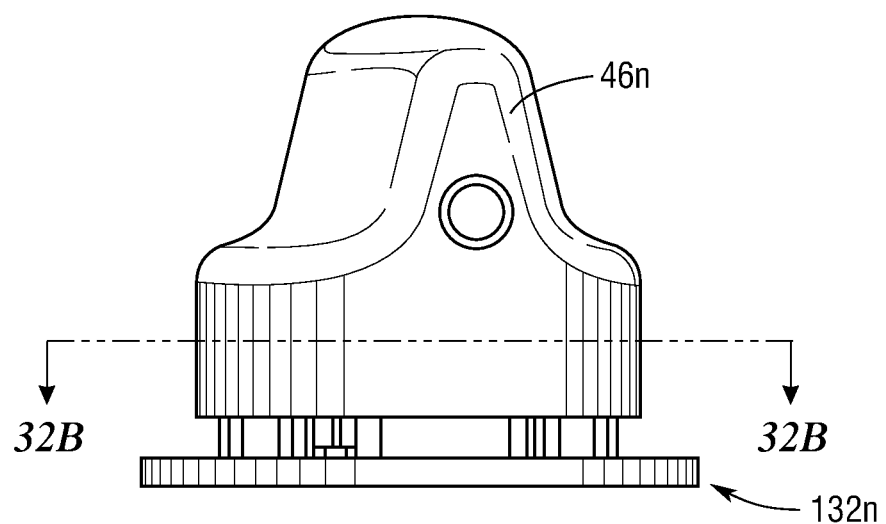
Figure 32B:
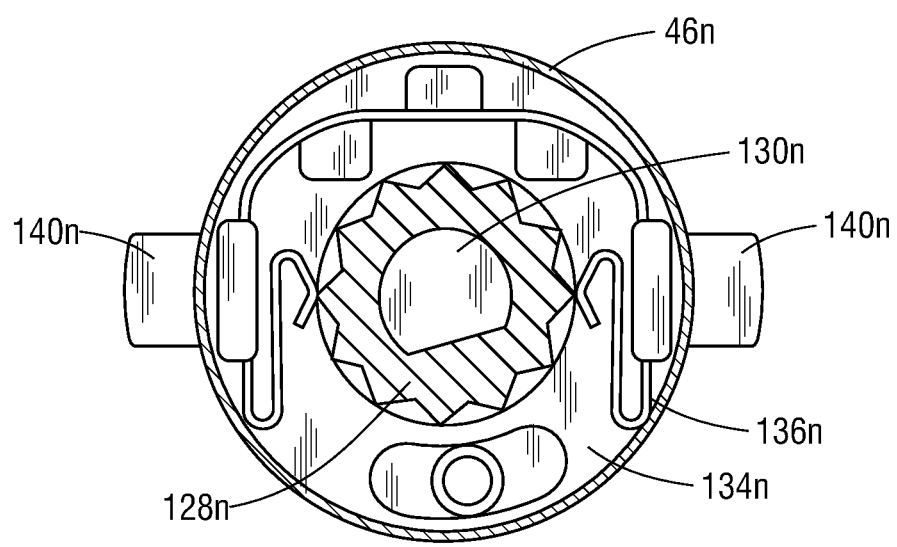
Figure 33:
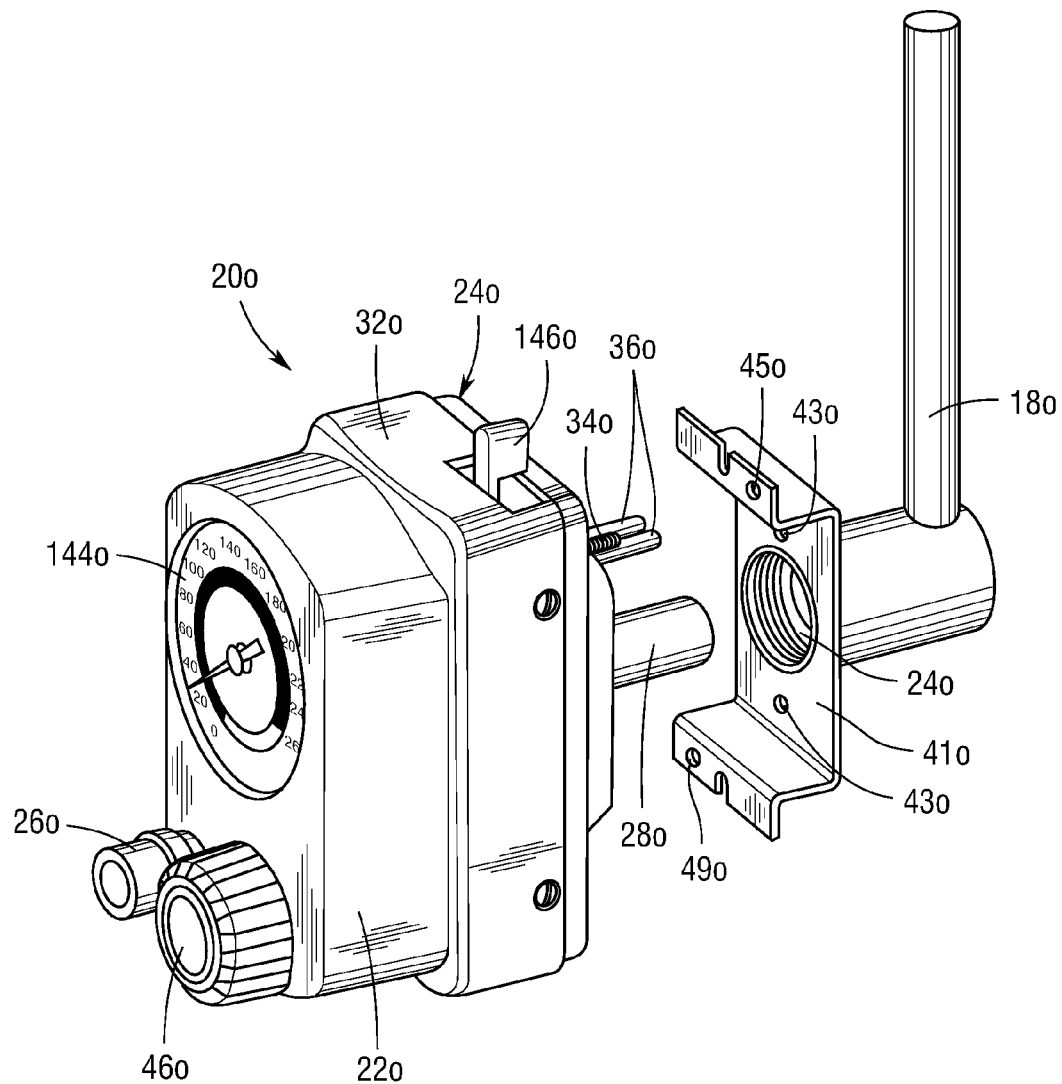

FIG. 2A is a schematic outlining the layout of an embodiment of a fluid fitting attached to a fluid handling conduit that is connected to a fluid supply source;

FIG. 2B is a schematic outlining the layout of an embodiment of a fluid fitting attached to a fluid handling conduit that is connected to a vacuum system;

FIG. 3 is a perspective view of the front of an embodiment of the fluid fitting;

FIG. 4 is a perspective view of the rear of the embodiment of the fluid fitting shown in FIG. 3;

FIG. 5 is an exploded view of the front of the embodiment of the fluid fitting shown in FIG. 3;

FIG. 6 is a cross sectional view through the line 6-6 shown in FIG. 3;

FIG. 7 is a cross sectional view through the line 7-7 shown in FIG. 3;

FIG. 8 is a cross sectional view through the line 8-8 shown in FIG. 3;

FIG. 9 is an exploded view of the rear of the embodiment of the fluid fitting shown in FIG. 3;

FIG. 10 is a close up perspective view of the flowmeter of the embodiment of the fluid fitting shown in FIG. 3;

FIG. 11 is a perspective view of the flowmeter of the embodiment of the fluid fitting shown in FIG. 10;

FIG. 12 is a close up perspective view of another embodiment of a flowmeter that could be used as the fluid management device of the fluid fitting;

FIG. 13 is a different perspective view of the flowmeter shown in FIG. 12;

FIG. 14 is a perspective view of the front of another embodiment of the fluid fitting;

FIG. 15 is a cross sectional view through the line 15-15 shown in FIG. 14;

FIG. 16 is an exploded view of the front of the embodiment of the fluid fitting shown in FIG. 14;

FIG. 17 is a schematic outlining the layout of another embodiment of a fluid fitting;

FIG. 18 is a perspective view of an example of implementation of the schematic shown in FIG. 17;

FIG. 19 is a cross sectional view through the line 19-19 shown in FIG. 18;

FIG. 20 is a schematic outlining the layout of another embodiment of a fluid fitting;

FIG. 21 is a perspective view of an example of implementation of the schematic shown in FIG. 20;

FIG. 22 is a cross sectional view through the line 22-22 shown in FIG. 21;

FIG. 23 is an exploded view of the front of another embodiment of a fluid fitting;

FIG. 24 is a perspective view of the front of another embodiment of the fluid fitting that includes a fluid flow indicator;

FIG. 25 is a cross sectional view of one embodiment of a fluid flow indicator when there is no fluid passing through it;

FIG. 26 is a cross sectional view of the embodiment of a fluid flow indicator shown in FIG. 25 when there is fluid passing through it;

FIG. 27 is a cross sectional view of another embodiment of a fluid flow indicator;

FIG. 28A is a perspective view of the front of a modified knob;

FIG. 28B is a perspective view of the rear of a modified knob;

FIG. 29A is a perspective view of the front of a knob spring assembly to which the knob shown in FIGS. 28A and 28B may be connected;

FIG. 29B is a perspective view of the front of a knob spring assembly to which the knob shown in FIGS. 28A and 28B may be connected;

FIG. 30 is an exploded view of the front of an embodiment of the fluid fitting that incorporates the knob and knob spring assembly shown in FIGS. 28A through 29B;

FIG. 31A is a perspective view of an assembled knob and knob spring assembly show in FIGS. 28A through 29B in a stable position;

FIG. 31B is a cross-sectional view through the line 31B-31B shown in FIG. 31A;

FIG. 32A is a perspective view of an assembled knob and knob spring assembly show in FIGS. 28A through 29B in an unstable position;

FIG. 32B is a cross-sectional view through the line 32B-32B shown in FIG. 32A;

FIG. 33 is a perspective view of another embodiment of a fluid fitting; and

Figure 34:
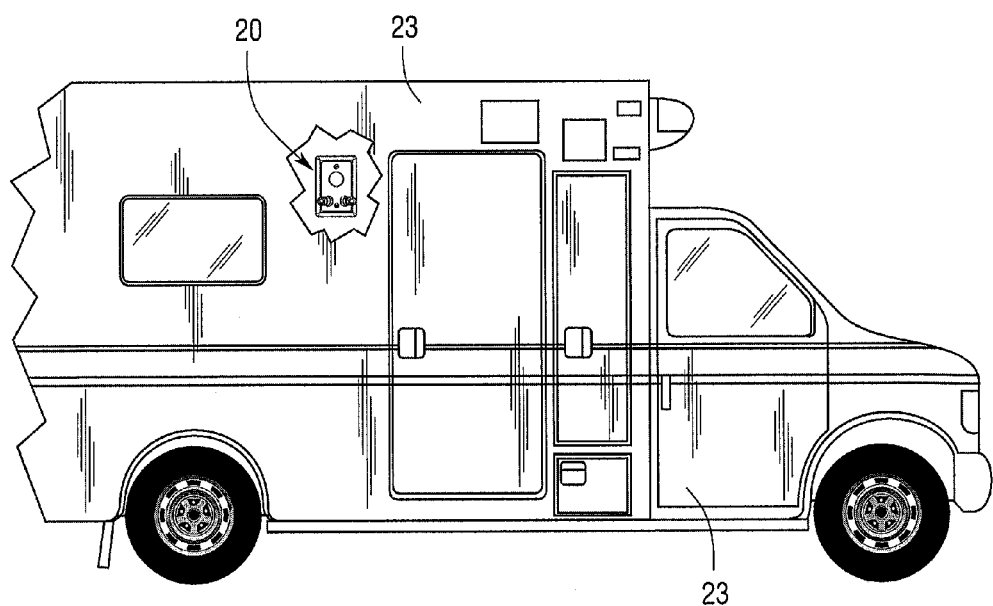

FIG. 34 is a side view of the embodiment of fluid fitting shown in FIG. 3 that is being used in a mobile facility.

DETAILED DESCRIPTION

Referring to the drawings, some of the reference numerals are used to designate the same or corresponding parts through several of the embodiments and figures shown and described. Corresponding parts are denoted in specific embodiments with the addition of lowercase letters. Variations of corresponding parts in form or function that are depicted in the figures are described. It will be understood that generally variations in the embodiments can be interchanged without deviating from the invention.

Fluid handling systems installed in facilities generally involve supplying fluid to or removing fluids from various points in the facility and generally comprise a source of fluid pressure with fluid handling conduits that connect the fluid pressure source to the point of use. The fluid pressure is positive, for example in an oxygen supply line in a medical facility, or negative, for example in a vacuum supply in surgical rooms for the removal of bodily fluids. In either situation, a fluid fitting of some sort is required for connection to the fluid handling conduit at the dispensing point to allow users access to the fluid supply or vacuum. What is provided is an improved fluid fitting in which a fluid management device or devices are incorporated into the fluid fitting. The improved fluid fittings can have any number of ports to provide multiple connections at a single fluid fitting.

Figure 1A:
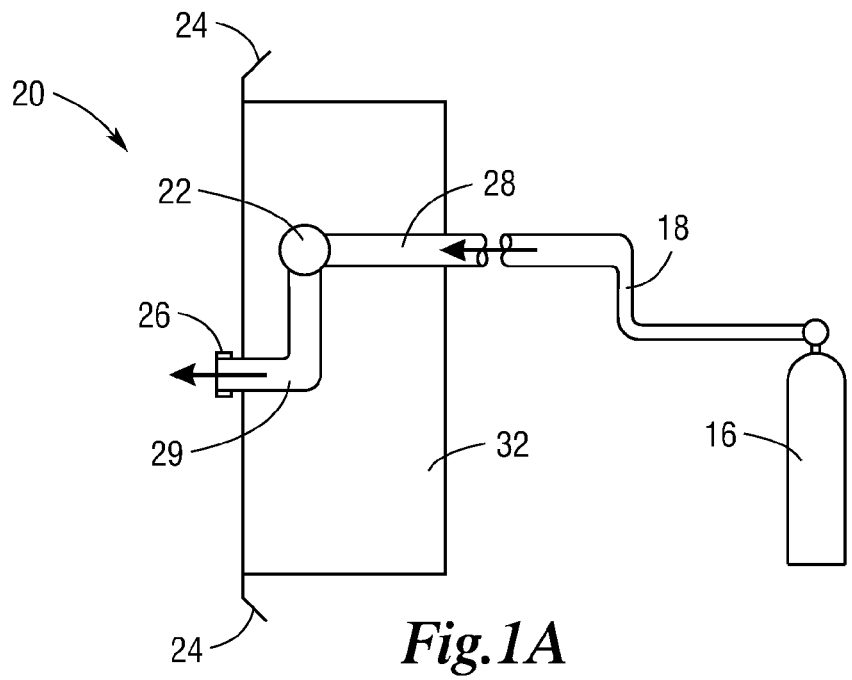
FIG. 1A is a schematic outlining the layout of an embodiment of a fluid fitting attached to a fluid handling conduit that is connected to a fluid supply source.

FIG. 1A shows a schematic of a fluid fitting 20 connected to fluid handling conduit 18 that is attached to a fluid source 16. The fluid fitting 20 comprises a housing 32 with a port 26 at the fluid dispensing point, a conduit adapter 28 connectable to the fluid handling conduit 18, a supply channel 29 that creates a flow path from the port 26 to the conduit adapter 28, and a fluid management device 22 incorporated in the flow path between the port 22 and the conduit adapter 28. A mounting component 24 enables the fluid fitting 20 to be attached to a surface in the facility where the fluid is to be dispensed.

The fluid management device 22 can be any device that maintains, regulates, monitors, or otherwise provides the user some additional functionality to the fluid fitting 20. For example, the fluid management device 22 can be a flowmetering device, flow rate measuring device, a fluid flow indicator, a fluid regulator, a fluid conserver, a chemical composition sensor, or any other device that adds functionality to the fluid fitting 20. These devices can be mechanical or electronic. As described herein, the flow path between the port 22 and the conduit adaptor 28 can incorporate a single fluid management device 22 or multiple devices.

The fluid fitting 20 can be mounted on walls in front of fluid handling conduits, on the headwalls above patient beds, semi-recessed flat walls, free standing power and utility service columns, horizontal headwalls, ceiling mounted service columns, equipment rails, floor mounted pedestals, wall panels, floor panels, ceiling panels, beds, surgical tables, or any other location at which a fluid fitting is required. The fluid fittings could be used in facilities such as hospitals, laboratories, schools, etc. As shown in FIG. 34, the fluid fitting 20 could be used in mobile facilities 23, such as ambulances (as shown), aircraft, ships, etc.

Figure 1B:
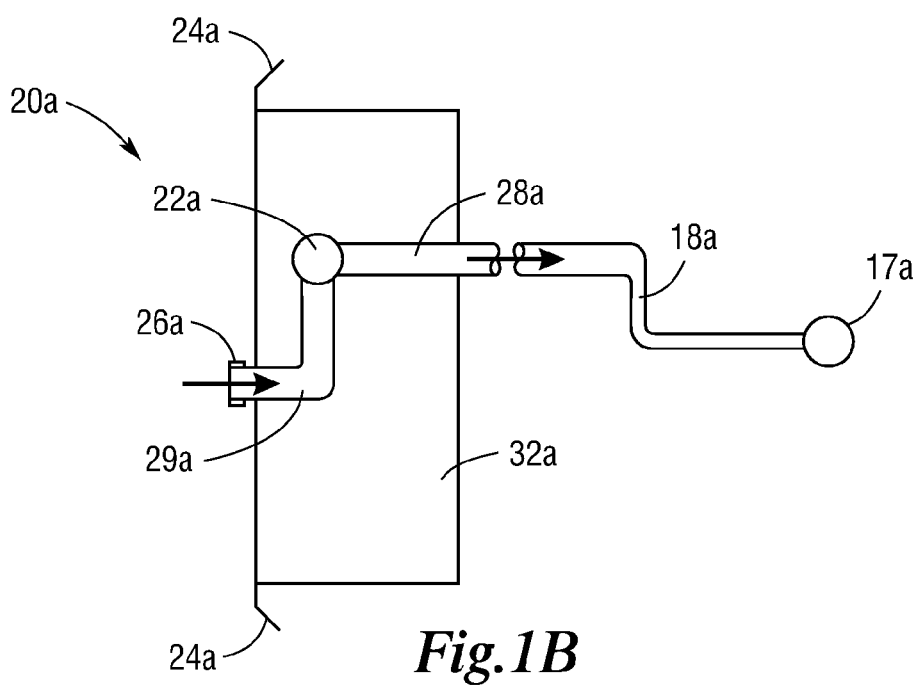
FIG. 1B is a schematic outlining the layout of an embodiment of a fluid fitting attached to a fluid handling conduit that is connected to a vacuum system.

FIG. 1B shows another embodiment of the fluid fitting 20a mounted to fluid handling conduit 18a that is connected to a vacuum source 17a. In this embodiment fluid flows in the opposite direction as that shown in FIG. 1A and the port 26a serves as a fluid inlet. The fluid management device 22a could be any device appropriate for the management of vacuum lines.

The fluid fitting can also integrate more than one port. FIG. 2A shows a fluid fitting 20b connected to a fluid supply source 16b that integrates a second port 30b connected to the conduit adapter 28b though an unregulated supply channel 33b that is integrated into the housing 32b. The schematic shown in FIG. 2A shows the second port 30b without an integrated fluid management device, but an additional fluid management device could be incorporated with the second port 30b if so desired. The fluid fitting 20b can be designed to have additional ports with or without integrated fluid management devices as required by the particular application. FIG. 2B shows a fluid fitting 20c with two ports 26c and 30c connected to a vacuum source 17c.

FIGS. 3 through 11 show one embodiment of a fluid fitting 20d having a first port 26d and a second port 30d. The first port 26d has an integrated fluid management device 22d in the flow path between the first port 26d and the conduit adapter 28b. The second port 30d has no fluid management device associated with it. In this embodiment, the fluid management device 22d is a flowmeter 22d. Comparing FIGS. 3 and 4, the fluid fitting 20d comprises a mounting component 24d with a housing 32d for the internal components of the fluid fitting 20d. Mounting screws 34d secure the fluid fitting 20d in place through holes 43d on a mounting bracket 41d on a fluid handling conduit 18d. The mounting bracket 41d is typically located behind a surface of the facility, such as a wall or a utility column. The conduit adapter 28d connects the fluid fitting 20d to the conduit socket 27d of the fluid handling conduit 18d to establish a fluid connection between the fluid fitting 20d and the fluid handling conduit 18d. The flowmeter (22d shown in subsequent figures) is located within the housing 32d and is installed in the flow path between the first port 26d and the conduit adapter 28d. An unregulated supply channel (33d shown in FIG. 8) located within the housing 32d connects the second port 30d to the conduit adapter 28d.

Facilities with fluid distribution systems often require distribution of more than one kind of fluid with independent fluid handling conduits 18d each supplying different fluids or vacuum. Thus it is important to be able to identify the function of a fluid handling conduit 18d. To differentiate between the contents of different fluid handling conduits, an indexing system has been adopted by the industry. The fluid fitting 20d incorporates such a system. Each location along the fluid handling conduit 18d that a fluid fitting 20d may be connected has a mounting bracket 41d on which a conduit socket 27d is provided. The mounting bracket 41d is installed recessed behind a surface with screws (not shown) through holes 45d so that an installed fluid fitting 20d does not extend much beyond the surface. The mounting bracket 41d is equipped with a set of conduit indexing sockets 37d. The type of fluid supplied by the fluid handling conduit determines the number and spacing of the conduit indexing sockets 37d. As shown in FIG. 4, the rear of the housing 32d includes a number of fitting indexing sockets 38d that correspond to every possible combination of conduit indexing sockets 37d. Indexing pins 36d are inserted in various combinations within the fitting indexing sockets 38d to correspond to conduit indexing sockets 37d on the fluid handling conduit 18d. The fluid fitting 20d may only be connected to a fluid handling conduit 18d if the appropriate combination of indexing pins 36d are inserted in the fitting indexing sockets 38d to match up with the conduit indexing sockets 37d on the mounting bracket 41d. The indexing pins 32d are installed in fluid fitting 20d during the manufacturing process and cannot be removed or rearranged by the user. This reduces incidences of fluid fittings 20d being connected to the wrong fluid handling conduit 18d. The relationship between a particular combination of indexing pins 32d to the function of the fluid handling conduit 18d is established by industry practice.

As can be best understood by comparing FIGS. 3 and 5, the components of the flowmeter 22d are installed in an orifice chamber 48d located within the housing 32d. A faceplate 42d with identifying information for the particular application of the fluid fitting 20d is mounted onto a recess in the housing 32d. A knob 46d is installed on a knob stem 86d to control the flowmeter 22d. Mounting screws 34d are inserted into the appropriate holes 35d in the faceplate 42d and the housing 32d for installation on the mounting bracket 41d.

As can be best understood by comparing in FIGS. 5 and 6, the flowmeter 22d comprises an orifice disc 50d, a washer 52d, a sealing disc 54d with a groove 57d into which an o-ring 56d fits, and a knob stem 86d. The sealing disc 54d and the o-ring 56d are sized to form a seal against the sides of the orifice chamber 48d. The orifice chamber 48d includes a spring recess 68d into which a spring 58d and a ball 60d are placed. As will be described in greater detail below, to help maintain the flowmeter 22d at a selected position, the spring 58d pushes against the ball 60d, which pushes against the orifice disc 50d. The orifice chamber 48d also includes a counter bore 70d that provides a fluid connection from the conduit adapter 28d to the flowmeter 22d through a supply hole 72d. A pair of o-rings 62d are placed in the counter bore 70d. The o-rings 62d are sized to form a seal against the orifice disc 50d and the sides of the counter bore 70d to prevent fluid leaks to the orifice chamber 48d. As will be explained in more detail below, stem hole 74d keeps the flowmeter 22d assembly aligned in the housing 32d.

The first and second ports 26d and 30d are installed into the housing 32d with o-rings 44d that are sized to form a seal against the sides of the regulated port chamber 66d and the unregulated port chamber 64d, respectively. As shown in FIG. 7, supply channel 29d, connects the orifice chamber 48d to the regulated port chamber 66d. FIG. 8 shows the fluid flow path of the unregulated second port 30d. An unregulated supply channel 33d connects the conduit adapter 28d to the unregulated port chamber 64d and the second port 30d. The unregulated supply channel 33d is formed by drilling through the housing 32d to the inlet chamber 78d. The resulting hole in the housing 32d is sealed with a plug 39d.

As can be best understood by comparing FIGS. 4 and 9, a sealing washer 76d is placed between the conduit adapter 28d and the inlet chamber 78d to ensure a leak free seal. The indexing pins 32d are inserted in the appropriate housing indexing sockets 38d to correspond to the indexing sockets on the fluid handling conduit. A back plate 40d, with appropriately sized holes to accommodate the indexing pins 36d, the conduit adapter 28d, and the mounting screws 34d, is installed to the back of the housing 32d with rivets 80d. The conduit adapter 28d is further secured with an adapter washer 82d and washer screws 84d.

A close-up of the flowmeter 22d used in the embodiments shown in FIGS. 3 through 9 is depicted in FIG. 10 showing the o-ring 56d installed within the groove 57d of the sealing disc 54d. The washer 52d is shown at its installed location adjacent the sealing disc 54d. The o-ring 56d is sized to press against the side of the orifice chamber 48d to form a leak-free seal, as shown in FIG. 6. The orifice disc 50d comprises a knob stem 86d that extends through the center of the orifice disc 50d. A stem extension 88d extends slightly from the rear of the orifice disc 50d. The stem extension 88d fits in to the stem hole 74d shown in FIG. 6 to help keep the flowmeter 22d aligned in the fluid fitting 20d. The base of the knob stem 86d has grooves 87d to seat the sealing disc 54d and the washer 52d. The distal end of the knob stem 86d has a D-shape to accommodate the knob 46d and to prevent the knob 46d from slipping on the knob stem 86d.

As can be best understood by comparing FIGS. 10 and 11, the orifice disc 50d includes a series of orifice holes 90d drilled in a circle near the outer circumference of the orifice disc 50d. Each of the orifice holes 90d is sized to allow a predetermined fluid flow rate through it at a specific pressure. The fluid supply systems of medical facilities typically operate at around 50 to 60 pounds per square inch (psi). Each orifice hole 90d empties into a secondary chamber 92d that houses a ball bearing 94d. The ball bearing 94d is used for calibration of the flow through the orifice hole 90d. Each secondary chamber 92d has a secondary orifice 96d located around the perimeter of the orifice disc 50d. As shown in FIG. 6, when the flowmeter 22d is installed in the fluid fitting 20d, each secondary orifice 96d opens to the orifice chamber 48d in the housing 32d.

Referring again to FIGS. 10 and 11, each orifice hole 90d has a corresponding click index 98d located closer to the stem extension 88d. The click indices 98d are semispherical grooves that allow the proper alignment of the orifice holes 90d with the supply hole 72d. As can be best understood by comparing FIGS. 10, 11, and 6, when the flowmeter 22d is installed in the fluid fitting 20d, the spring 58d in the spring recess 68d presses the ball 60d up against one of the click indices 98d. The spring 58d is strong enough to maintain the position of the flowmeter 22d at a selected setting, but weak enough that turning the knob 46d pushes the ball 60d into the spring recess 68d and allows the orifice disc 50d to rotate about its axis. This rotation moves another click index 98d over the spring recess and another orifice hole 90d into position over the supply hole 72d. The supply hole 72d can be sized to limit the fluid flow rate to a predetermined maximum or can incorporate a flow restrictor (not shown).

Other designs of flowmeters can be incorporated as flow management devices in the fluid fitting. FIGS. 12 and 13 show another flowmeter embodiment comprising an orifice disc 50e. As can be best understood by comparing FIGS. 12 and 13, the orifice disc 50e comprises a series of orifice holes 90e drilled in a circle near the outer circumference of the orifice disc 50e through the thickness of the orifice disc 50e. Each of orifice hole 90e is sized to allow a predetermined fluid flow rate through it at a specific pressure. Counter bores 106e are drilled into the orifice disc 50e to reduce the depth to which each orifice hole 90e must be drilled. The orifice holes 90e open to the orifice chamber in which the flowmeter 22e is installed. Other functions of this embodiment of the orifice disc 50e perform similarly to the flowmeter embodiment depicted in FIGS. 10 and 11.

Other embodiments of the fluid fitting can include other types of flowmeters as flow management devices such as adjustable flow control valves. As shown in FIGS. 14, 15, and 16, in one embodiment the adjustable flow control valve is a needle valve 22f. The needle valve 22f is located along the centerline of the counter bore 70f. A flow restrictor 100f calibrated to limit the fluid flow rate to a predetermined maximum is installed in the supply hole 72f. The flow restrictor 100f allows for calculations of the fluid flow rate based on the position of the needle valve 22f in the counter bore 70f.

As can be best understood by comparing FIGS. 15 and 16, the needle valve 22f is housed within an orifice chamber 48f. The needle valve 22f comprises a stem 86f with a shaft 102f having external threads inserted into the fluid fitting 20f. The tip of the shaft 102f has a tapered needle 104f that is aligned with the counter bore 70f in the orifice chamber 48f such that when the needle valve 22f is in the closed position, the walls of the needle 104f press against circumference of the flow restrictor 100f to form a seal. The counter bore 70f within the orifice chamber 48f has internal threads to accommodate the external threads of the shaft 102f. The shaft 102f forms a leak-free seal against the counter bore 70f. O-ring 56f is installed within the groove 57f of the sealing disc 54f. Washer 52f is installed adjacent the sealing disc 54f. The o-ring 56f is sized to press against the side of the orifice chamber 48f to form a leak-free seal.

The distal end of the knob stem 86f has a D-shape to accommodate a corresponding D-shaped recess (not shown) in the knob 46f. When the knob 46f is turned, the knob stem 86f and the shaft 102f will turn as well. To operate the needle valve 22f, the knob 46f is twisted counterclockwise to pull the shaft 102f and the needle 104f away from the flow restrictor 100f. The resulting opening between the needle 104f and the flow restrictor 100f creates a fluid pathway from the inlet chamber 78f to the supply channel (not shown), the regulated port chamber 66f, and the first port 26f. Further counterclockwise turning of the knob 46f will increase the size of the opening between the needle 104f and the flow restrictor 100f, which increases the fluid flow rate through the first port 26f. A valve stop (not shown) can be used to limit how far the knob 46f can be turned in the counterclockwise direction. Turning the knob 46f in a clockwise direction decreases the size of the opening between the needle 104f and the flow restrictor 100f, which decreases the fluid flow rate through the first port 26f.

More than one fluid management device can be incorporated into the flow path between a port and a conduit adapter. For example, flow measuring devices can be incorporated with flowmeters in the fluid fittings so that the fluid flow rate can be monitored. FIG. 17 is a schematic of a possible fluid fitting 20g incorporating one type of flow measuring device 105g that comprises an electronic flow sensor 106g. While the embodiment shown in FIG. 17 comprises an electronic flow sensor 106g, the flow measuring device 105g can be electronic or mechanical (for example a Thorpe tube and ball or a rotating indicator like a paddle wheel or turbine). The flow sensor 106g is connected to a digital display 108g with a wire 107g. The measured flow rate is displayed on the digital display 108g. FIG. 18 shows a perspective view of a fluid fitting 20h incorporating the features shown in FIG. 17. As shown in FIG. 19, the flow sensor 106h is located in the flow path upstream of the flowmeter 22h, but the sensor can be located downstream of the flowmeter 22h, for example, in the regulated port chamber (not shown) or in the first port 26h.

FIG. 20 is a schematic of another possible fluid fitting 20i incorporating two fluid management devices, in this case a Thorpe tube 110i as a flow measuring device 105i and a flowmeter 22i. FIG. 21 shows a perspective view of a fluid fitting 22j incorporating the features depicted in FIG. 20. As can be best understood by comparing FIGS. 21 and 22, a Thorpe tube 110j comprises a vertically mounted tube 110j within which an indicator floater 112j is placed. The regulated supply channel 73j is directed to the bottom of the vertically mounted tube 110j and continues from the top of the vertically mounted tube 110j to end at the flow restrictor 100j. To operate the needle valve 22j, the knob 46j is twisted counterclockwise to pull the shaft 102j and the needle 104j away from the flow restrictor 100j to create a fluid pathway from the inlet chamber 78j to the first port 26j. As fluid flows through the regulated supply channel 73j, it enters the vertically mounted tube 110j and pushes the indicator floater 112j upwards. The design of the indicator floater 112j is such that fluid is allowed to flow past it to continue through the vertically mounted tube 110j. The higher the fluid flow rate, the higher the indicator floater 112j is pushed. The vertically mounted tube 110j is marked to indicate the flow rate corresponding to the height of the indicator floater 112j in the tube. It will be noted that the Thorpe tube 110i, 110j can be upstream of the flowmeter 22i, 22j as in FIG. 20 or downstream of the flowmeter 22i, 22j as in FIG. 22.

The fluid fitting can include a fluid management device that merely maintains the integrity of the fluid flow path between the port and the conduit adapter. For example, FIG. 23 shows an exploded view of a fluid outlet which includes a stopper 150k that plugs the orifice chamber 48k while maintaining the fluid flow path between the port 26k and the conduit adapter 28k. The stopper 150k has a pair of retaining arms 140k that fit into the corresponding slots 142k in the housing 32k. An o-ring 56k helps maintain a seal between the orifice chamber 48k and the stopper 150k. The stopper 150k may be removed and replaced with different fluid management devices as required.

Another fluid management device that the fluid fitting can have is a fluid flow indicator that provides a visual indication of fluid flow passing through whichever port the fluid flow indicator is in fluid connection with. FIG. 24 shows an example of a fluid fitting 20l in which a fluid flow indicator 114l is in fluid connection with the first port 26l. In this particular embodiment, the fluid fitting 20l comprises two fluid management devices—a stopper 150l and the fluid flow indicator 114l. As shown in FIGS. 25 and 26, the fluid flow indicator 114l comprises a casing 116l that includes a recess 118l, inlet and outlet connections 120l and 122l, and an indicator device 124l. FIG. 25 shows the indicator device 124l as a light plastic ball, but any device that would generally not impede the fluid flow through the fluid flow indicator 114l can be used. A window 126l is provided in the faceplate 42g through which the casing 116l is visible. The casing 116l can be made of a clear material or can include clear material on the side facing the window 126l such that the recess 118l is visible through the window 126l. As shown if FIG. 25, when there is no fluid flow passing through the port 26l that the fluid flow indicator 114l is connected to, the indicator device 124l lies in the flow path of the inlet connection 120l and cannot be seen through the window 126l. As shown if FIG. 26, when fluid flows through the fluid flow indicator 114l, the indicator device 124l is pushed into the recess 118l, which allows the fluid to continue past the indicator device 124l and though the outlet connection 122l to the port 26l. The indicator device 124l is visible through the window 126l when it is pushed into the recess 118l by the fluid flow. For improved visibility, the indicator device 124*l* can be of a bright color or a color that contrasts with the color of the faceplate 42*l*. While only one fluid flow indicator is shown in the embodiment depicted in FIGS. 24 through 26, each port in the fluid fitting can have dedicated fluid flow indicators.

FIG. 27 shows an example of a fluid flow indicator 114*m* with a rotating indicator device 124*m*, in this case a paddle wheel 124*m*, installed in the fluid path between the inlet connection 120*m* and the outlet connection 122*m*. The paddle wheel 124*m* is installed with about halfway inside a recess 118*m*. The casing 116*m* can be made of a clear material or can include clear material on the side facing the window 126*m* such that the paddle wheel 124*m* is visible through the window 126*m*. When fluid flows through the fluid flow indicator 114*m* the paddles wheel 124*m* rotate and this movement is visible though the window 126*m*. For improved visibility, the paddle wheel 124*m* can be of a bright color or a color that contrasts with the color of the housing or each alternate paddle can be of a different color. Other rotating indicator devices such as turbines can also be used.

In fluid fittings that have fluid management devices that are flowmeters of the orifice disc types depicted in FIGS. 3 through 11, the flowmeter 22*b* has to be at discrete positions in order to establish a fluid connection between the fluid handling conduit 28*b* and the port 26*b*. Users must be certain that the orifice 90*b* corresponding to the selected flow rate is aligned with the supply hole 72*b*. This is also true of the flowmeter depicted in FIGS. 12 and 13 and any other type of flowmeter that has to be in a discrete position in order to maintain a fluid connection between the fluid handling conduit and the port.

One possible method of assuring this alignment is shown in FIGS. 28A through 32B. As can be best understood by comparing FIGS. 28A though 30, the underside of a knob has gears 128*n* surrounding the D-shaped recess 130*n*. This knob 46*n*, is sized to fit over a knob spring assembly 132*n*. The knob spring assembly 132*n* comprises a spring housing 134*n* on which a selecting spring 136*n* is mounted such that the spring arms 138*n* of the selecting spring 136*n* are biased towards the center of the knob spring assembly 132*n*. The knob spring assembly 132*n* sits in the orifice chamber 48*n* of the fluid fitting 20*n* between the sealing disc 54*n* and the faceplate 42*n*. The housing 32*n* has slots 142*n* to accommodate the retainer arms 140*n* of the knob spring assembly 132*n* that serve to prevent the knob spring assembly 132*n* from rotating. The D-shaped recess 130*n* of the knob 46*n* fits over the knob stem 86*n* so that when the knob 46*n* turns, the orifice disc 50*n* will turn as well.

In its stable condition, the gears 128*n* of the knob 46*n* fit between spring arms 138*n*, as shown in FIGS. 31A and 31B. When the knob 46*n* is twisted in either direction the spring arms 138*n* and the gears 128*n* are placed in an unstable position, as shown in FIGS. 32A and 32B, in which the spring arms 138*n* exert pressure on the on the gears 128*n* such that the knob 46*n* will be biased to return to a stable position. Each stable position corresponds to a particular flow rate setting on the flowmeter 22*n* such that, with the exception of an "off" setting, a fluid connection is maintained between the fluid handling conduit 28*n* and the port 26*n*.

Fluid fittings for connection to fluid handling conduits that carry vacuum can have fluid management devices designed for vacuum systems. For example, FIG. 33 shows a fluid fitting 20*o* with one port 26*o* with three the fluid management devices: a pressure regulator 22*o* with a knob 46*o*, an analog gauge 144*o* for reading the regulated negative pressure, and a selector switch 146*o* with three modes—off, regulate, and full line pressure.

Other possible fluid management devices include vacuum pressure regulators and flowmeters of other designs, fluid conserver, fluid regulator, fluid flow rate sensors, chemical composition sensors, fluid flow indicators, and any other device that is capable of integration into a fluid fitting.

This invention has been described with reference to several preferred embodiments. Many modifications and alterations will occur to others upon reading and understanding the preceding specification. It is intended that the invention be construed as including all such alterations and modifications in so far as they come within the scope of the appended claims or the equivalents of these claims.

The invention claimed is:

1. A fluid fitting for use in a facility that has a plurality of surfaces and a source of fluid pressure, comprising:
   each of the surfaces having an external side and an internal side;
   the facility having a fluid handling conduit extending from the source of fluid pressure to the internal side of one of the surfaces to which said fluid fitting is connectable;
   said fluid fitting comprising:
   a mounting component to enable said fluid fitting to be mounted to the external side of the surface;
   a conduit adapter connectable to the fluid handling conduit in the internal side of the surface;
   a port protruding from said fluid fitting on the external side of the surface, having a flow path to said conduit adapter to enable a fluid connection between said conduit adapter and said port, said flow path establishing a fluid connection from said fluid handling conduit to said port through the external side of the surface; and
   a fluid management device incorporated in said flow path wherein said fluid management device provides functionality in the internal side of the surface.

2. The fluid fitting of claim 1 further comprising more than one fluid management device located in said flow path.

3. The fluid fitting of claim 1 further comprising:
   a first port and a second port;
   each of said ports protruding from said fluid fitting on the external side of the surface;
   said first port having a first flow path to said conduit adapter to enable a fluid connection between said conduit adapter and said first port;
   said second port having a second flow path to said conduit adapter to enable a fluid connection between said conduit adapter and said second port; and
   a fluid management device incorporated in the flow path between said first port and said conduit adapter wherein said fluid management device provides functionality in the internal side of the surface.

4. The fluid fitting of claim 1 further comprising:
   a first port and a second port;
   said first port having a first flow path to said conduit adapter to enable a fluid connection between said conduit adapter and said first port;
   said second port having a second flow path to said conduit adapter to enable a fluid connection between said conduit adapter and said second port; and
   more than one fluid management device located in the flow path between said first port and said conduit adapter.

5. The fluid fitting of claim 1 further comprising more than one port, each port having a flow path to said conduit adapter to enable a fluid connection between said conduit adapter and said port.

6. The fluid fitting of claim 1 in which said fluid management device is removable and replaceable.

7. The fluid fitting of claim 1 in which said fluid management device comprises a stopper capable of maintaining the integrity of said flow path.

8. The fluid fitting of claim 1 in which said fluid management device comprises a flowmeter to receive and control the fluid flow rate in said flow path.

9. The fluid fitting of claim 1 in which said fluid management device comprises a flowmeter with one or more selectable calibrated orifices to select the fluid flow rate in said flow path.

10. The fluid fitting of claim 1 in which said fluid management device comprises a flowmeter with one or more selectable calibrated orifices to select the fluid flow rate in said flow path, said flowmeter further comprising a control knob for selecting the desired orifice.

11. The fluid fitting of claim 1 in which said fluid management device comprises a flowmeter with an orifice and an adjustable flow control valve to adjust the size of said orifice to control the fluid flow rate in said flow path.

12. The fluid fitting of claim 1 in which said fluid management device comprises a flowmeter with an orifice and an adjustable flow control valve to adjust the size of said orifice to control the fluid flow rate in said flow path, said flowmeter further comprising a control knob for adjusting said adjustable flow control valve.

13. The fluid fitting of claim 1 in which said fluid management device comprises a flow measuring device for indicating the rate of fluid flow in said flow path.

14. The fluid fitting of claim 1 in which said fluid management device comprises a flow measuring device for indicating the rate of fluid flow in said flow path, said flow measuring device is a Thorpe tube and ball, a gauge and needle, a digital sensor and display, or an indicator and knob.

15. The fluid fitting of claim 1 further comprising at least one flow restrictor to restrict the maximum flow rate through said at least one port.

16. The fluid fitting of claim 1 in which said fluid management device comprises a fluid flow indicator that provides a visible indication of fluid flow in said flow path.

17. The fluid fitting of claim 1 in which said fluid management device comprises a fluid flow indicator that provides a visible indication of fluid flow in said flow path, said fluid flow indicator comprises a device that does not generally impede fluid flow though said fluid flow indicator.

18. The fluid fitting of claim 1 in which said fluid management device comprises a fluid flow indicator that provides a visible indication of fluid flow in said flow path, said fluid flow indicator is a ball, a rotating indicator, or an electronic sensor.

19. The fluid fitting of claim 1 in which said fluid management device comprises a flowmeter having one or more selectable calibrated orifices to select the fluid flow rate in said flow path and a control knob for selecting the desired orifice, said control knob further comprising a mechanism to help reestablish a fluid connection between the fluid handling conduit and said port when said control knob is operated.

20. The fluid fitting of claim 1 in which said fluid management device comprises a flowmeter having one or more selectable calibrated orifices to select the fluid flow rate in said flow path and a control knob for selecting the desired orifice, said control knob further comprising a spring mechanism to help reestablish a fluid connection between the fluid handling conduit and said port to which said flowmeter is connected when said control knob is operated.

21. The fluid fitting of claim 1 in which said surface is a wall, a semi-recessed flat wall, a service column, a horizontal headwall, a ceiling mounted service column, an equipment rail, a wall panel, a floor panel, a ceiling panel, a bed, a surgical table, or a floor pedestal.

22. The fluid fitting of claim 1 in which the facility is a mobile facility.

23. The fluid fitting of claim 1 in which the fluid fitting supplies a vacuum.

24. The fluid fitting of claim 1 in which the fluid fitting supplies fluid under positive pressure.

25. A fluid fitting for use in a facility that has a plurality of surfaces and a source of gas under positive pressure, comprising:
   each of the surfaces having an external side and an internal side;
   a gas handling conduit extending from the source of gas under positive pressure to the internal side of one of the surfaces to which said fluid fitting is connectable;
   said fluid fitting comprising:
   a mounting component to enable said fluid fitting to be mounted to the external side of one of the surfaces;
   a conduit adapter connectable to the gas handling conduit in the internal side of the surface;
   a port protruding from said fluid fitting on the external side of the surface, having a flow path to said conduit adapter to enable a fluid connection between said conduit adapter and said port and to enable a fluid connection from said gas handling conduit through the external side of the surface;
   a flowmeter incorporated in said flow path to receive and control the gas flow rate in said flow path; and
   said flowmeter provides functionality in the internal side of the surface.

26. The fluid fitting of claim 25 further comprising at least one fluid management device incorporated in said flow path wherein said fluid management device provides functionality in the internal side of the surface.

27. The fluid fitting of claim 25 further comprising:
   a first port and a second port;
   each of said ports protruding from said fluid fitting on the external side of the surface;
   said first port having a first flow path to said conduit adapter to enable a fluid connection between said conduit adapter and said first port;
   said second port having a second flow path to said conduit adapter to enable a fluid connection between said conduit adapter and said second port; and
   said flowmeter incorporated in the flow path between said first port and said conduit adapter wherein said flowmeter provides functionality in the internal side of the surface.

28. The fluid fitting of claim 25 further comprising:
   a first port and a second port;
   each of said ports protruding from said fluid fitting on the external side of the surface;
   said first port having a first flow path to said conduit adapter to enable a fluid connection between said conduit adapter and said first port;
   said second port having a second flow path to said conduit adapter to enable a fluid connection between said conduit adapter and said second port;
   said flowmeter incorporated in the flow path between said first port and said conduit adapter wherein said flowmeter provides functionality in the internal side of the surface; and
   a fluid management device incorporated in the flow path between said first port and said conduit adapter wherein said fluid management device provides functionality in the internal side of the surface.

29. The fluid fitting of claim 25 further comprising more than one port, each port having a flow path to said conduit adapter to enable a fluid connection between said conduit adapter and said port.

30. The fluid fitting of claim 25 in which said flowmeter comprises one or more selectable calibrated orifices to select the fluid flow rate in said flow path.

31. The fluid fitting of claim 25 in which said flowmeter comprises one or more selectable calibrated orifices to select the gas flow rate in said flow path, said flowmeter further comprising a control knob for selecting the desired orifice.

32. The fluid fitting of claim 25 in which said flowmeter comprises an orifice and an adjustable flow control valve to adjust the size of said orifice to control the gas flow rate in said flow path.

33. The fluid fitting of claim 25 in which said flowmeter comprises an orifice and an adjustable flow control valve to adjust the size of said orifice to control the gas flow rate in said flow path, said flowmeter further comprising a control knob for adjusting said adjustable flow control valve.

34. The fluid fitting of claim 25 in which said flowmeter comprises one or more selectable calibrated orifices in the internal side of the surface to select the gas flow rate in said flow path and a control knob in the external side of the surface for selecting the desired orifice, said control knob further comprising a mechanism to help reestablish a fluid connection between the gas handling conduit and said port when said control knob is operated.

35. The fluid fitting of claim 25 in which said flowmeter comprises one or more selectable calibrated orifices in the internal side of the surface to select the gas flow rate in said flow path and a control knob in the external side of the surface for selecting the desired orifice, said control knob further comprising a spring mechanism to help reestablish a fluid connection between the gas handling conduit and said port to which said flowmeter is connected when said control knob is operated.

36. The fluid fitting of claim 25 further comprising at least one flow restrictor to restrict the maximum flow rate through said at least one port.

37. The fluid fitting of claim 25 further comprising a flow measuring device for indicating the rate of gas flow in said flow path.

38. The fluid fitting of claim 25 further comprising a flow measuring device for indicating the rate of gas flow in said flow path, said flow measuring device is a Thorpe tube and ball, a gauge and needle, a digital sensor and display, or an indicator and knob.

39. The fluid fitting of claim 25 further comprising a fluid flow indicator that provides a visible indication of gas flow in said flow path.

40. The fluid fitting of claim 25 further comprising a fluid flow indicator that provides a visible indication of gas flow in said flow path, said fluid flow indicator comprises a device that does not generally impede gas flow though said fluid flow indicator.

41. The fluid fitting of claim 25 further comprising a fluid flow indicator that provides a visible indication of gas flow in said flow path, said fluid flow indicator is a ball, a rotating indicator, or an electronic sensor.

42. The fluid fitting of claim 25 in which said surface is a wall, a semi-recessed flat wall, a service column, a horizontal headwall, a ceiling mounted service column, an equipment rail, a wall panel, a floor panel, a ceiling panel, a bed, a surgical table, or a floor pedestal.

* * * * *